United States Patent
Seo et al.

(10) Patent No.: US 10,900,780 B2
(45) Date of Patent: Jan. 26, 2021

(54) METHOD FOR DETERMINING DATA OF BAROMETER SENSOR USING DATA OBTAINED FROM MOTION SENSOR AND ELECTRONIC DEVICE FOR THE SAME

(71) Applicant: Samsung Electronics Co., Ltd., Gyeonggi-do (KR)

(72) Inventors: Yunhwa Seo, Gyeonggi-do (KR); Jeong Gwan Kang, Gyeonggi-do (KR); Yanggu Jo, Seoul (KR); Byungjun Lee, Gyeonggi-do (KR); Narin Kim, Seoul (KR); Taeho Kim, Chungcheongbuk-do (KR); Jeong-Min Park, Gyeonggi-do (KR)

(73) Assignee: Samsung Electronics Co., Ltd

( * ) Notice: Subject to any disclaimer, the term of this patent is extended or adjusted under 35 U.S.C. 154(b) by 80 days.

(21) Appl. No.: 16/005,211

(22) Filed: Jun. 11, 2018

(65) Prior Publication Data

US 2018/0364040 A1    Dec. 20, 2018

(30) Foreign Application Priority Data

Jun. 20, 2017 (KR) .......................... 10-2017-0077823

(51) Int. Cl.
*G01C 5/06*    (2006.01)
*G01C 25/00*   (2006.01)

(52) U.S. Cl.
CPC .............. *G01C 5/06* (2013.01); *G01C 25/00* (2013.01)

(58) Field of Classification Search
CPC .................................. G01C 5/06; G01C 25/00
See application file for complete search history.

(56) References Cited

U.S. PATENT DOCUMENTS

| 10,330,494 B2 * | 6/2019 | Barfield ................. G01D 3/036 |
| 2007/0218823 A1 | 9/2007 | Wolf |
| 2016/0320186 A1 | 11/2016 | Tanabe et al. |

(Continued)

FOREIGN PATENT DOCUMENTS

| JP | H05322682 | 12/1993 |
| JP | 2518294 | 7/1996 |
| JP | 2004-183607 | 7/2004 |

(Continued)

OTHER PUBLICATIONS

International Search Report dated Sep. 20, 2018 issued in counterpart application No. PCT/KR2018/006494, 10 pages.

(Continued)

*Primary Examiner* — Jamel E Williams
(74) *Attorney, Agent, or Firm* — The Farrell Law Firm, P.C.

(57) ABSTRACT

An electronic device is provided. The electronic device includes a barometer sensor configured to measure a barometric pressure of the electronic device, a motion sensor configured to detect a motion of the electronic device, and a processor configured to obtain, using the barometer sensor, first data relating to a change of the barometric pressure, obtain, using the motion sensor while the first data is obtained, second data relating to the motion of the electronic device, and if the first data corresponds to the second data, determine the first data as data corresponding to the barometric pressure.

16 Claims, 19 Drawing Sheets

(56) References Cited

U.S. PATENT DOCUMENTS

2019/0328333 A1* 10/2019 Wijshoff ............ A61B 5/14552

FOREIGN PATENT DOCUMENTS

| JP | 2011-117770 | 6/2011 |
| JP | 2013-221440 | 10/2013 |
| JP | 2015-004578 | 1/2015 |
| KR | 1020140090071 | 7/2014 |
| KR | 1020150111693 | 10/2015 |

OTHER PUBLICATIONS

European Search Report dated Mar. 24, 2020 issued in counterpart application No. 18821208.8-1001, 9 pages.

* cited by examiner (1510)

(1520)

METHOD FOR DETERMINING DATA OF BAROMETER SENSOR USING DATA OBTAINED FROM MOTION SENSOR AND ELECTRONIC DEVICE FOR THE SAME

CROSS-REFERENCE TO RELATED APPLICATION(S)

This application is based on and claims priority under 35 U.S.C. § 119(a) to Korean Patent Application Serial No. 10-2017-0077823, which was filed on Jun. 20, 2017 in the Korean Intellectual Property Office, the entire disclosure of which is incorporated herein by reference.

BACKGROUND

1. Field

The present disclosure relates to an electronic device, and more particularly, to an electronic device and a method for determining data of a barometer sensor using data obtained from a motion sensor.

2. Description of the Related Art

Various electronic devices such as a mobile communication terminal, a personal digital assistant (PDA), an electronic notebook, a smart phone, a tablet personal computer (PC), and a wearable device are widely used. Such electronic devices continue to improve in terms of hardware and/or software. For example, an electronic device can adopt a water and dust proof structure to protect the electronic device from foreign substances.

Electronic devices can also include various sensors (e.g., an accelerometer sensor, a gyro sensor, a barometer sensor, etc.) for providing various functions (e.g., directions, health care, etc.). For example, if a barometer sensor is included in the electronic device, the electronic device may include a hole to drive the barometer sensor so that the barometer sensor may measure an atmospheric pressure, e.g., by measuring air stream entering through the hole.

To help drive a barometer sensor, the holes can be formed with a material (e.g., a membrane) for allowing air to flow through the hole; however, if the hole is blocked or contaminated with a foreign substance such as a liquid (e.g., water, sweat, rain, etc.) or dust, the air may not adequately flow through the hole. As can be appreciated, if the air is not allowed to flow through the hole unimpeded, a sensor value measured at/by the barometer sensor may not be accurate. As a result thereof, some of functions of the electronic device using the sensor value measured at the barometer sensor may not be performed successfully, or may provide inaccurate information.

SUMMARY

The disclosure has been made to address at least the disadvantages described above and to provide at least the advantages described below. Accordingly, an aspect of the disclosure provides a method and an apparatus for using barometric pressure data according to whether the barometric pressure data measured at the barometer sensor is reliable, by determining whether the barometer sensor malfunctions using a motion sensor.

In accordance with an aspect of the disclosure, there is provided an electronic device. The electronic device includes a barometer sensor configured to measure a barometric pressure of the electronic device, a motion sensor configured to detect a motion of the electronic device, and a processor configured to obtain, using the barometer sensor, first data relating to a change of the barometric pressure, obtain, using the motion sensor while the first data is obtained, second data relating to the motion of the electronic device, and if the first data corresponds to the second data, determine the first data as data corresponding to the barometric pressure.

In accordance with an aspect of the disclosure, there is provided a method for operating an electronic device which comprises a barometer sensor and a motion sensor. The method includes obtaining, using the barometer sensor, first data relating to a change of a barometric pressure, obtaining, using the motion sensor while the first data is obtained, second data relating to a motion of the electronic device, and if the first data corresponds to the second data, determining the first data as data corresponding to a barometric pressure.

In accordance with an aspect of the disclosure, there is provided a non-transitory computer-readable recording medium having stored thereon a plurality of instructions that when executed perform a method for operating an electronic device which comprises a barometer sensor and a motion sensor. The method includes obtaining, using the barometer sensor, first data relating to a change of a barometric pressure, obtaining, using the motion sensor while the first data is obtained, second data relating to a motion of the electronic device, and if the first data corresponds to the second data, determining the first data as data corresponding to a barometric pressure.

BRIEF DESCRIPTION OF THE DRAWINGS

The above and other aspects, features and advantages of certain embodiments of the disclosure will be more apparent from the following detailed description taken in conjunction with the accompanying drawings, in which.

DETAILED DESCRIPTION

Figure 1:
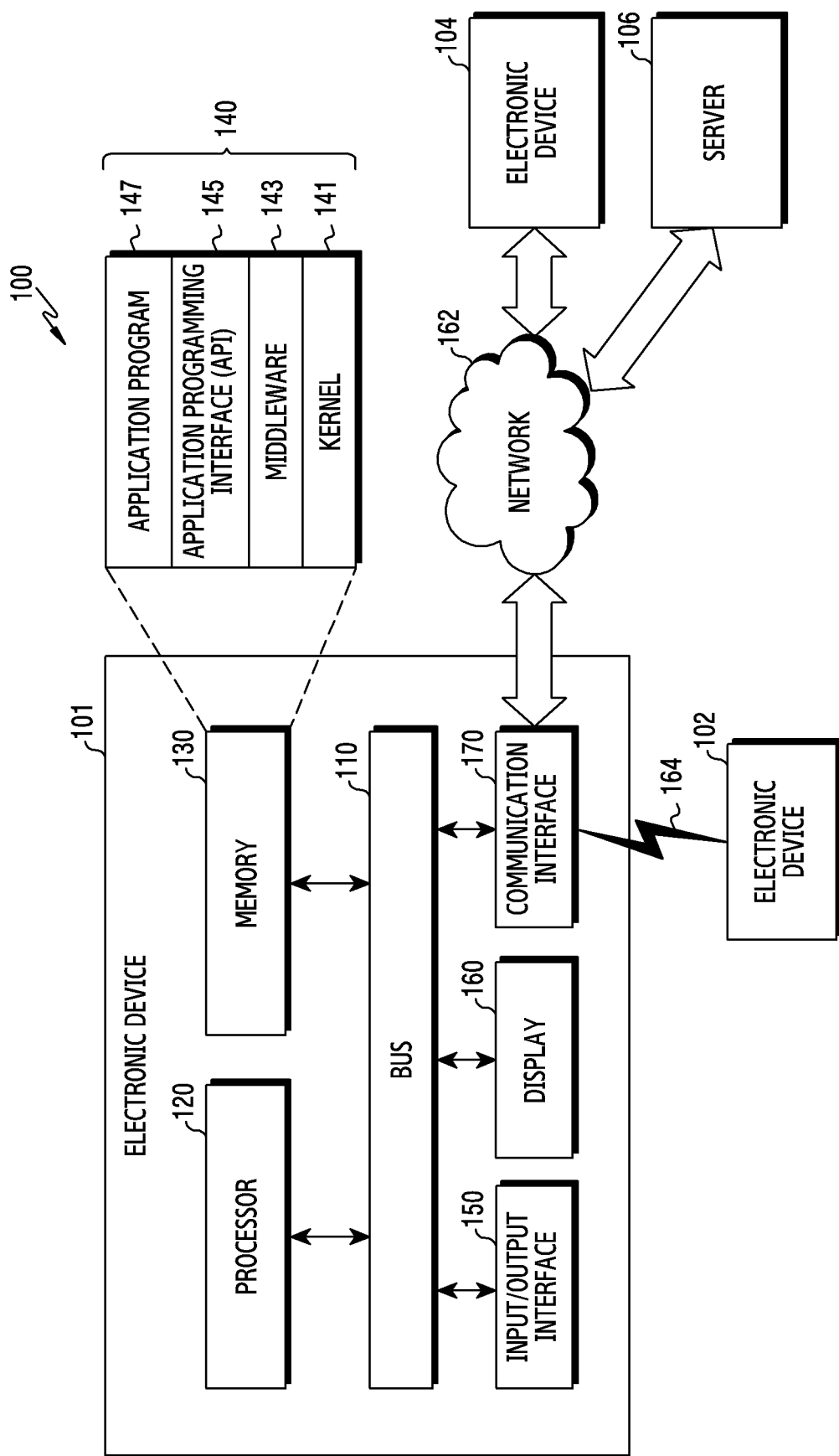
FIG. 1 is a diagram of an electronic device in a network environment, according to an embodiment.

Embodiments of the disclosure will be described herein below with reference to the accompanying drawings. However, the embodiments of the disclosure are not limited to the specific embodiments and should be construed as including all modifications, changes, equivalent devices and methods, and/or alternative embodiments of the present disclosure. In the description of the drawings, similar reference numerals are used for similar elements.

The terms "have," "may have," "include," and "may include" as used herein indicate the presence of corresponding features (for example, elements such as numerical values, functions, operations, or parts), and do not preclude the presence of additional features.

The terms "A or B," "at least one of A or/and B," or "one or more of A or/and B" as used herein include all possible combinations of items enumerated with them. For example, "A or B," "at least one of A and B," or "at least one of A or B" means (1) including at least one A, (2) including at least one B, or (3) including both at least one A and at least one B.

The terms such as "first" and "second" as used herein may use corresponding components regardless of importance or an order and are used to distinguish a component from another without limiting the components. These terms may be used for the purpose of distinguishing one element from another element. For example, a first user device and a second user device may indicate different user devices regardless of the order or importance. For example, a first element may be referred to as a second element without departing from the scope the disclosure, and similarly, a second element may be referred to as a first element.

It will be understood that, when an element (for example, a first element) is "(operatively or communicatively) coupled with/to" or "connected to" another element (for example, a second element), the element may be directly coupled with/to another element, and there may be an intervening element (for example, a third element) between the element and another element. To the contrary, it will be understood that, when an element (for example, a first element) is "directly coupled with/to" or "directly connected to" another element (for example, a second element), there is no intervening element (for example, a third element) between the element and another element.

The expression "configured to (or set to)" as used herein may be used interchangeably with "suitable for," "having the capacity to," "designed to," "adapted to," "made to," or "capable of" according to a context. The term "configured to (set to)" does not necessarily mean "specifically designed to" in a hardware level. Instead, the expression "apparatus configured to . . . " may mean that the apparatus is "capable of . . . " along with other devices or parts in a certain context. For example, "a processor configured to (set to) perform A, B, and C" may mean a dedicated processor (e.g., an embedded processor) for performing a corresponding operation, or a generic-purpose processor (e.g., a central processing unit (CPU) or an application processor (AP)) capable of performing a corresponding operation by executing one or more software programs stored in a memory device.

The terms used in describing the various embodiments of the disclosure are for the purpose of describing particular embodiments and are not intended to limit the disclosure. As used herein, the singular forms are intended to include the plural forms as well, unless the context clearly indicates otherwise. All of the terms used herein including technical or scientific terms have the same meanings as those generally understood by an ordinary skilled person in the related art unless they are defined otherwise. The terms defined in a generally used dictionary should be interpreted as having the same or similar meanings as the contextual meanings of the relevant technology and should not be interpreted as having ideal or exaggerated meanings unless they are clearly defined herein. According to circumstances, even the terms defined in this disclosure should not be interpreted as excluding the embodiments of the disclosure.

The term "module" as used herein may, for example, mean a unit including one of hardware, software, and firmware or a combination of two or more of them. The "module" may be interchangeably used with, for example, the term "unit", "logic", "logical block", "component", or "circuit". The "module" may be a minimum unit of an integrated component element or a part thereof. The "module" may be a minimum unit for performing one or more functions or a part thereof. The "module" may be mechanically or electronically implemented. For example, the "module" according to the disclosure may include at least one of an application-specific integrated circuit (ASIC) chip, a field-programmable gate array (FPGA), and a programmable-logic device for performing operations which has been known or are to be developed hereinafter.

An electronic device according to the disclosure may include at least one of, for example, a smart phone, a tablet personal computer (PC), a mobile phone, a video phone, an electronic book reader (e-book reader), a desktop PC, a laptop PC, a netbook computer, a workstation, a server, a personal digital assistant (PDA), a portable multimedia player (PMP), a MPEG-1 audio layer-3 (MP3) player, a mobile medical device, a camera, and a wearable device. The wearable device may include at least one of an accessory type (e.g., a watch, a ring, a bracelet, an anklet, a necklace, a glasses, a contact lens, or a head-mounted device (HMD)), a fabric or clothing integrated type (e.g., an electronic clothing), a body-mounted type (e.g., a skin pad, or tattoo), and a bio-implantable type (e.g., an implantable circuit).

The electronic device may be a home appliance. The home appliance may include at least one of, for example, a television, a digital video disk (DVD) player, an audio, a refrigerator, an air conditioner, a vacuum cleaner, an oven, a microwave oven, a washing machine, an air cleaner, a set-top box, a home automation control panel, a security control panel, a TV box (e.g., Samsung HomeSync™, Apple TV™, or Google TV™), a game console (e.g., Xbox™ and PlayStation™), an electronic dictionary, an electronic key, a camcorder, and an electronic photo frame.

The electronic device may include at least one of various medical devices (e.g., various portable medical measuring devices (a blood glucose monitoring device, a heart rate monitoring device, a blood pressure measuring device, a body temperature measuring device, etc.), a magnetic resonance angiography (MRA), a magnetic resonance imaging (MRI), a computed tomography (CT) machine, and an ultrasonic machine), a navigation device, a global positioning system (GPS) receiver, an event data recorder (EDR), a flight data recorder (FDR), a vehicle infotainment device, an electronic device for a ship (e.g., a navigation device for a ship, and a gyro-compass), avionics, security devices, an automotive head unit, a robot for home or industry, an automatic teller machine (ATM) in banks, point of sales (POS) devices in a shop, or an Internet of things (IoT) device (e.g., a light bulb, various sensors, electric or gas meter, a sprinkler device, a fire alarm, a thermostat, a streetlamp, a toaster, a sporting goods, a hot water tank, a heater, a boiler, etc.).

The electronic device may include at least one of a part of furniture or a building/structure, an electronic board, an electronic signature receiving device, a projector, and various kinds of measuring instruments (e.g., a water meter, an electric meter, a gas meter, and a radio wave meter). The electronic device may be a combination of one or more of the aforementioned various devices. The electronic device may also be a flexible device. Further, the electronic device is not limited to the aforementioned devices, and may include an electronic device according to the development of new technology.

Hereinafter, an electronic device will be described with reference to the accompanying drawings. In the disclosure, the term "user" may indicate a person using an electronic device or a device (e.g., an artificial intelligence electronic device) using an electronic device.

FIG. 1 is a diagram of a network environment including an electronic device, according to an embodiment.

An electronic device 101 within a network environment 100 may include a bus 110, a processor 120, a memory 130, an input/output interface 150, a display 160, and a communication interface 170. The electronic device 101 may omit at least one of the above elements or may further include other elements.

The bus 110 may include a circuit for connecting the elements 110-170 and transferring communication (e.g., control messages and/or data) between the elements.

The processor 120 may include one or more of a CPU, an AP, and a communication processor (CP). The processor 120 may carry out operations or data processing relating to control and/or communication of at least one other element of the electronic device 101.

The memory 130 may include a volatile memory and/or a non-volatile memory. The memory 130 may store instructions or data relevant to at least one other element of the electronic device 101. The memory 130 may store software and/or a program 140. The program 140 may include a kernel 141, middleware 143, an application programming interface (API) 145, and/or application programs (applications) 147. At least some of the kernel 141, the middleware 143, and the API 145 may be referred to as an operating system (OS).

The kernel 141 may control or manage system resources (e.g., the bus 110, the processor 120, or the memory 130) used for performing an operation or function implemented by the other programs (e.g., the middleware 143, the API 145, or the application 147). Furthermore, the kernel 141 may provide an interface through which the middleware 143, the API 145, or the application 147 may access the individual elements of the electronic device 101 to control or manage the system resources.

The middleware 143 may function as an intermediary for allowing the API 145 or the application 147 to communicate with the kernel 141 to exchange data.

The middleware 143 may process one or more operation requests received from the application 147 according to priority. For example, the middleware 143 may give priority to use the system resources of the electronic device 101 (e.g., the bus 110, the processor 120, the memory 130, and the like) to at least one of the application 147. The middleware 143 may perform scheduling or load balancing with respect to the one or more operation requests by processing the one or more operation requests according to the priority given to the at least one application program.

The API 145 is an interface through which the application 147 control functions provided from the kernel 141 or the middleware 143, and may include at least one interface or function (e.g., instruction) for file control, window control, image processing, or text control.

The input/output interface 150 may function as an interface that may transfer instructions or data input from a user or another external device to the other element(s) of the electronic device 101. Furthermore, the input/output interface 150 may output the instructions or data received from the other element(s) of the electronic device 101 to the user or another external device.

The display 160 may include a liquid crystal display (LCD), a light emitting diode (LED) display, an organic light emitting diode (OLED) display, a micro electro mechanical system (MEMS) display, or an electronic paper display. The display 160 may display various types of content (e.g., text, images, videos, icons, or symbols) for the user. The display 160 may include a touch screen and may receive a touch, gesture, proximity, or hovering input using an electronic pen or the user's body part.

The communication interface 170 may set communication between the electronic device 101 and a first external electronic device 102, a second external electronic device 104, or a server 106. The communication interface 170 may be connected to a network 162 through wireless or wired communication to communicate with the second external electronic device 104 or the server 106.

The wireless communication may use at least one of long-term evolution (LTE), LTE-advance (LTE-A), code division multiple access (CDMA), wideband CDMA (WCDMA), universal mobile telecommunications system (UMTS), WiBro (Wireless Broadband), and global system for mobile communications (GSM), as a cellular communication protocol. In addition, the wireless communication may include short range communication 164. The short-range communication 164 may be performed by using at least one of wireless-fidelity (Wi-Fi), bluetooth (BT), BT low energy (BLE), near field communication (NFC), and global navigation satellite system (GNSS). The GNSS may include a global positioning system (GPS), a global navigation satellite system (Glonass), a Beidou navigation satellite system (Beidou), and a European global satellite-based navigation system (Galileo), according to a use area, a bandwidth, or the like. Hereinafter, GPS may be interchangeably used with GNSS. The wired communication may include at least one of, for example, a universal serial bus (USB), a high definition multimedia interface (HDMI), recommended standard 232 (RS-232), and a plain old telephone service (POTS). The network 162 may include a communication network such as a computer network (e.g., a local area network (LAN) or a wide band network (WAN)), the internet, and a telephone network.

Each of the first and second external electronic apparatuses 102 and 104 may be of a type identical to or different from that of the electronic apparatus 101. The server 106 may include a group of one or more servers. All or some of the operations performed in the electronic device 101 may be performed in another electronic device or the electronic devices 102 and 104 or the server 106. When the electronic device 101 has to perform some functions or services automatically or in response to a request, the electronic device 101 may make a request for performing at least some functions relating thereto to the electronic device 102 or 104 or the server 106 instead of performing the functions or services by itself or in addition. Another electronic apparatus may execute the requested functions or the additional functions, and may deliver a result of the execution to the electronic apparatus 101. The electronic device 101 may process the received result as it is, or additionally to provide the requested functions or services. To achieve this, cloud computing, distributed computing, or client-server computing technology may be used.

Figure 2:
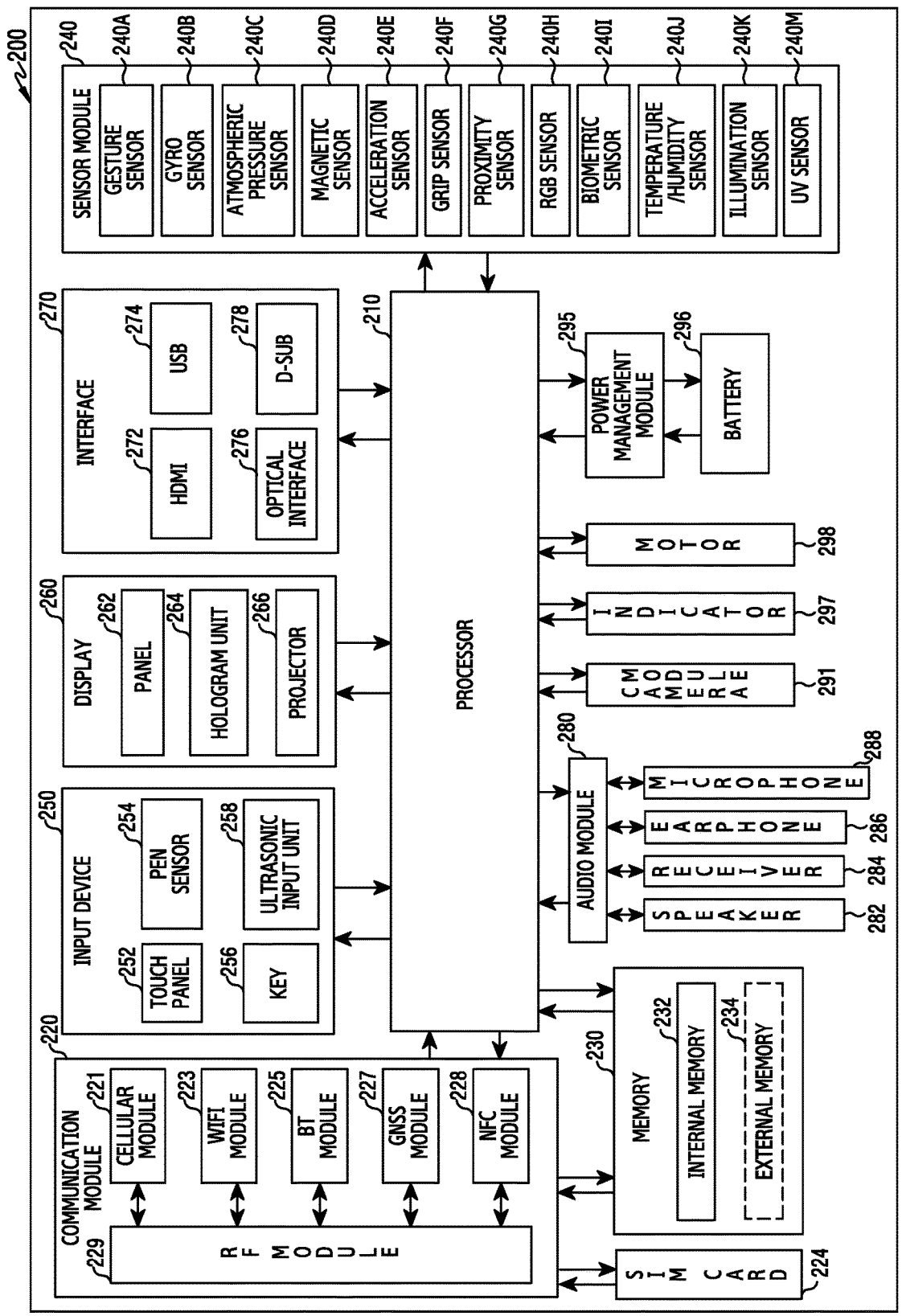
FIG. 2 is a diagram of an electronic device, according to an embodiment.

FIG. 2 is a diagram of an electronic device, according to an embodiment.

An electronic device 201 may include some or all of the components of the electronic apparatus 101 of FIG. 1. The electronic device 201 may include at least one processor (e.g., an AP) 210, a communication module 220, a subscriber identification module (SIM) 224, a memory 230, a sensor module 240, an input device 250, a display 260, an interface 270, an audio module 280, a camera module 291, a power management module 295, a battery 296, an indicator 297, and a motor 298.

The processor 210 may control a plurality of hardware or software components connected to the processor 210 by driving an OS or an AP and perform processing of various pieces of data and calculations. The processor 210 may be implemented by a system on chip (SoC). The processor 210 may further include a graphic processing unit (GPU) and/or an image signal processor. The processor 210 may include at least some (e.g., a cellular module 221) of the elements illustrated in FIG. 2. The processor 210 may load, into a volatile memory, instructions or data received from at least one (e.g., a non-volatile memory) of the other elements and may process the loaded instructions or data, and may store various data in a non-volatile memory.

The communication module 220 may have a configuration identical or similar to that of the communication interface 170 of FIG. 1. The communication module 220 may include the cellular module 221, a Wi-Fi module 223, a BT module 225, a GNSS module 227 (e.g., a GPS module, a Glonass module, a Beidou module, or a Galileo module), an NFC module 228, and a radio frequency (RF) module 229.

The cellular module 221 may provide a voice call, image call, a text message service, or an internet service through, for example, a communication network. The cellular module 221 may distinguish between and authenticate electronic devices 201 within a communication network using the SIM 224. The cellular module 221 may perform at least some of the functions that the processor 210 may provide. The cellular module 221 may include a CP.

Each of the Wi-Fi module 223, the BT module 225, the GNSS module 227, and the NFC module 228 may include a processor for processing data transmitted and received through the relevant module. At least some (e.g., two or more) of the cellular module 221, the Wi-Fi module 223, the BT module 225, the GNSS module 227, and the NFC module 228 may be included in one integrated chip (IC) or IC package.

The RF module 229 may transmit/receive a communication signal (e.g. an RF signal). The RF module 229 may include a transceiver, a power amplifier module (PAM), a frequency filter, a low noise amplifier (LNA), and an antenna. At least one of the cellular module 221, the Wi-Fi module 223, the BT module 225, the GNSS module 227, and the NFC module 228 may transmit and receive RF signals through a separate RF module.

The SIM 224 may be an embedded SIM, and may contain unique identification information (e.g., an integrated circuit card identifier (ICCID)) or subscriber information (e.g., an international mobile subscriber identity (IMSI)).

The memory 230 may include an internal memory 232 or an external memory 234. The embedded memory 232 may include at least one of a volatile memory (for example, a dynamic random access memory (DRAM), a static RAM (SRAM), a synchronous dynamic RAM (SDRAM), and the like) and a non-volatile memory (e.g. a one-time programmable read only memory (OTPROM), a programmable ROM (PROM), an erasable and programmable ROM (EPROM), an electrically erasable and programmable ROM (EEPROM), a mask ROM, a flash ROM, a flash memory (e.g., a NAND flash memory or a NOR flash memory), a hard disc drive, a solid state drive (SSD), and the like).

The external memory 234 may further include a flash drive, e.g., a compact flash (CF), a secure digital (SD), a micro secure digital (Micro-SD), a mini secure digital (Mini-SD), an eXtreme digital (xD), a memory stick, or the like. The external memory 234 may be functionally and/or physically connected to the electronic apparatus 201 through various interfaces.

The sensor module 240 may measure a physical quantity or detect an operation state of the electronic device 201, and may convert the measured or detected information into an electrical signal. For example, the sensor module 240 may include at least one of a gesture sensor 240A, a gyro sensor 240B, an atmospheric pressure sensor 240C, a magnetic sensor 240D, an acceleration sensor 240E, a grip sensor 240F, a proximity sensor 240G, a color sensor 240H (e.g., a red/green/blue (RGB) sensor), a bio-sensor 240I, a temperature/humidity sensor 240J, a light sensor 240K, and an ultra violet (UV) sensor 240M. Additionally or alternatively, the sensor module 240 may include an e-nose sensor, an electromyography (EMG) sensor, an electroencephalogram (EEG) sensor, an electrocardiogram (ECG) sensor, an infrared (IR) sensor, an iris sensor, and/or a fingerprint sensor. The sensor module 240 may further include a control circuit for controlling one or more sensors included therein. The electronic apparatus 201 may further include a processor configured to control the sensor module 240 as a part of or separately from the processor 210, and may control the sensor module 240 while the processor 210 is in a sleep state.

The input device 250 may include a touch panel 252, a (digital) pen sensor 254, a key 256, or an ultrasonic input device 258. The touch panel 252 may use at least one of a capacitive type, a resistive type, an infrared type, and an ultrasonic type. Also, the touch panel 252 may further include a control circuit. The touch panel 252 may further include a tactile layer and provide a tactile reaction to the user.

The (digital) pen sensor 254 may include a recognition sheet which is a part of the touch panel or is separated from the touch panel. The key 256 may include a physical button, an optical key or a keypad. The ultrasonic input device 258 may detect ultrasonic wavers generated by an input tool through a microphone 288 and identify data corresponding to the detected ultrasonic waves.

The display 260 may include a panel 262, a hologram device 264 or a projector 266. The panel 262 may include a configuration that is identical or similar to the display 160 illustrated in FIG. 1. The panel 262 may be flexible, transparent, or wearable. The panel 262 and the touch panel 252 may be implemented as one module. The hologram 264 may show a three dimensional image in the air by using an interference of light. The projector 266 may display an image by projecting light onto a screen. The screen may be located inside or outside the electronic apparatus 201. The display 260 may further include a control circuit for controlling the panel 262, the hologram device 264, or the projector 266.

The interface 270 may include a high-definition multimedia interface (HDMI) 272, a USB 274, an optical interface 276, or a d-subminiature (D-sub) 278. The interface 270 may be included in the communication interface 170 illustrated in FIG. 1. Additionally or alternatively, the interface 270 may include a mobile high-definition link (MHL) interface, a secure Digital (SD) card/multi-media card (MMC) interface, or an infrared data association (IrDA) standard interface.

The audio module 280 may bilaterally convert a sound and an electrical signal. At least some elements of the audio module 280 may be included in the input/output interface 145 illustrated in FIG. 1. The audio module 280 may process sound information which is input or output through a speaker 282, a receiver 284, earphones 286, the microphone 288 or the like.

The camera module 291 is a device which may photograph a still image and a dynamic image. The camera module 291 may include one or more image sensors (e.g., a front sensor or a back sensor), a lens, an image signal processor (ISP) or a flash (e.g., LED or xenon lamp).

The power management module 295 may manage power of the electronic device 201. The power management module 295 may include a power management integrated circuit (PMIC), a charger integrated circuit (IC), or a battery gauge. The PMIC may use a wired and/or wireless charging method. Examples of the wireless charging method may include a magnetic resonance method, a magnetic induction method, an electromagnetic method, and the like. Additional circuits (e.g., a coil loop, a resonance circuit, a rectifier, etc.) for wireless charging may be further included. The battery gauge may measure a residual quantity of the battery 296, and a voltage, a current, or a temperature during the charging. The battery 296 may include a rechargeable battery or a solar battery.

The indicator 297 may display a particular state (e.g., a booting state, a message state, a charging state, or the like) of the electronic apparatus 201 or a part (e.g., the processor 210) thereof. The motor 298 may convert an electrical signal into mechanical vibration, and may generate vibration, a haptic effect, or the like. Although not illustrated, the electronic apparatus 201 may include a processing unit (e.g., a GPU) for supporting a mobile television (TV). The processing unit for supporting mobile TV may process media data according to a certain standard such as digital multimedia broadcasting (DMB), digital video broadcasting (DVB), or MediaFlo™.

Each of the above-described component elements of hardware may be configured with one or more components, and the names of the corresponding component elements may vary based on the type of electronic device 200. The electronic device 200 may include at least one of the aforementioned elements. Some elements may be omitted or other additional elements may be further included in the electronic device 200. Also, some of the hardware components according to various embodiments may be combined into one entity, which may perform functions identical to those of the relevant components before the combination.

Figure 3:
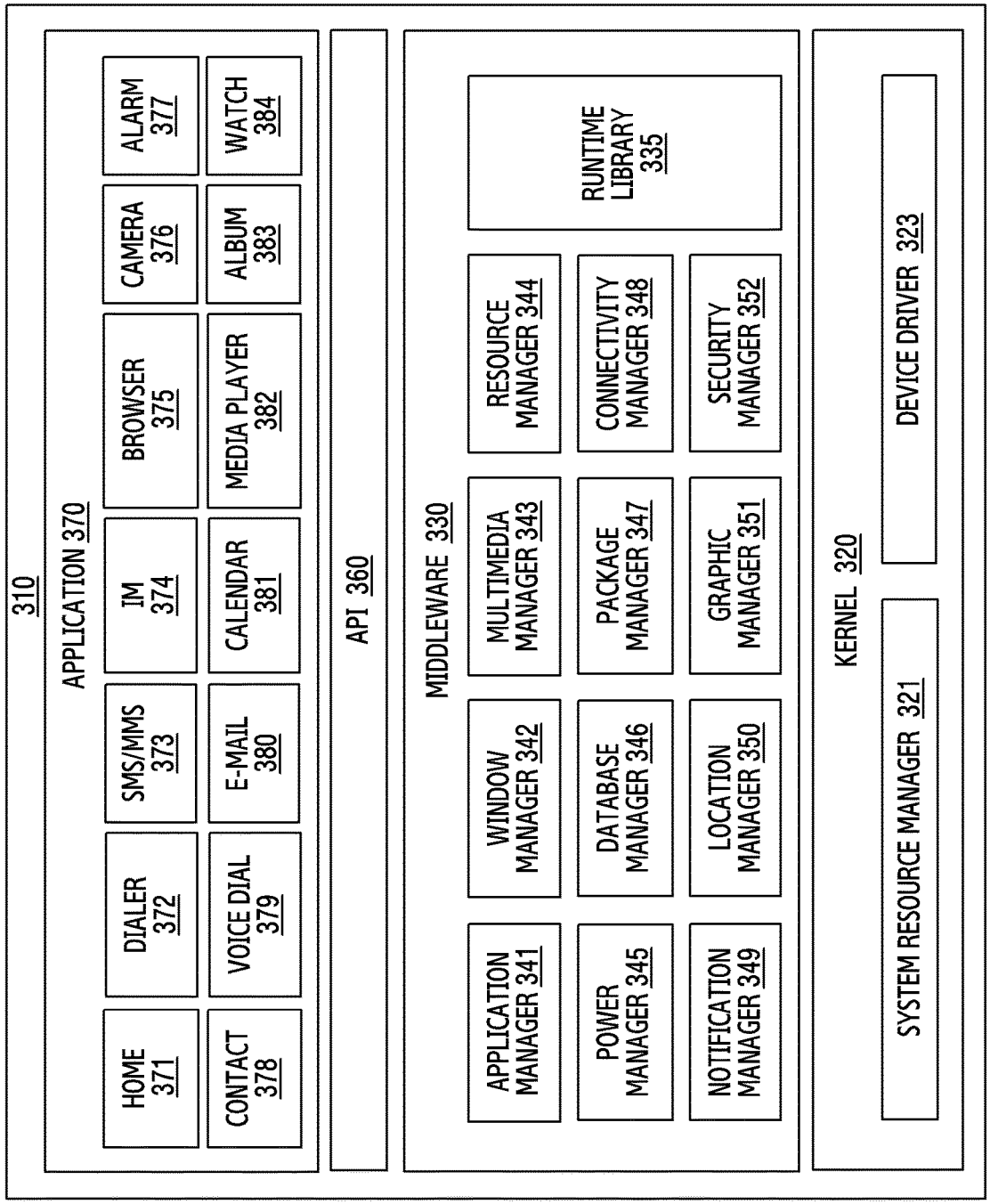
FIG. 3 is a diagram of a program module, according to an embodiment.

FIG. 3 is a diagram of a program module, according to an embodiment.

A program module 310 may include an OS for controlling resources related to an electronic device (e.g., the electronic device 101/200) and/or various applications (e.g., the application 147) executed in the OS. The OS may be Android™, iOS™, Windows™, Symbian™, Tizen™, Bada™, or the like.

The program module 310 may include a kernel 320, middleware 330, an API 360, and/or an application 370. At least some of the program module 310 may be preloaded on the electronic apparatus, or may be downloaded from an external electronic apparatus (e.g., the electronic apparatus 102 or 104, or the server 106).

The kernel 320 may include a system resource manager 321 and/or a device driver 323. The system resource manager 321 may perform the control, allocation, retrieval, or the like of system resources. The system resource manager 321 may include a process manager, a memory manager, a file system manager, or the like. The device driver 323 may include a display driver, a camera driver, a BT driver, a shared memory driver, a USB driver, a keypad driver, a Wi-Fi driver, an audio driver, or an inter-process Communication (IPC) driver.

The middleware 330 may provide a function required by the applications 370 in common or provide various functions to the applications 370 through the API 360 so that the applications 370 can efficiently use limited system resources within the electronic device. The middleware 330 may include at least one of a runtime library 335, an application manager 341, a window manager 342, a multimedia manager 343, a resource manager 344, a power manager 345, a database manager 346, a package manager 347, a connectivity manager 348, a notification manager 349, a location manager 350, a graphic manager 351, and a security manager 352.

The runtime library 335 may include a library module that a compiler uses in order to add a new function through a programming language while the applications 370 are being executed. The runtime library 335 may perform input/output management, memory management, the functionality for an arithmetic function, or the like.

The application manager 341 may manage the life cycle of at least one of the applications 370. The window manager 342 may manage graphical user interface (GUI) resources used for the screen. The multimedia manager 343 may determine a format required to reproduce various media files, and may encode or decode a media file by using a coder/decoder (codec) appropriate for the relevant format. The resource manager 344 may manage resources, such as a source code, a memory, a storage space, and the like of at least one of the applications 370.

The power manager 345 may operate together with a basic input/output system (BIOS) to manage a battery or power and may provide power information required for the operation of the electronic device. The database manager 346 may generate, search for, and/or change a database to be used by at least one of the applications 370. The package manager 347 may manage the installation or update of an application distributed in the form of a package file.

The connectivity manager 348 may manage a wireless connection such as Wi-Fi or BT. The notification manager 349 may display or notify of an event, such as an arrival message, an appointment, a proximity notification, and the like, in such a manner as not to disturb the user. The location manager 350 may manage location information of the electronic device. The graphic manager 351 may manage a graphic effect, which is to be provided to the user, or a user interface related to the graphic effect. The security manager 352 may provide various security functions required for system security, user authentication, and the like. When the electronic device has a telephone call function, the middleware 330 may further include a telephony manager for managing a voice call function or a video call function of the electronic device.

The middleware 330 may include a middleware module that forms a combination of various functions of the above-described elements. The middleware 330 may provide a module specialized for each type of OS in order to provide a differentiated function. Also, the middleware 330 may dynamically delete some of the existing elements, or may add new elements.

The API 360 is a set of API programming functions, and may be provided with a different configuration according to an OS. In the case of Android™ or iOS™, one API set may be provided for each platform. In the case of Tizen™, two or more API sets may be provided for each platform.

The applications 370 may include one or more applications which can provide functions such as a home application 371, a dialer application 372, an SMS/MMS application 373, an instant message (IM) application 374, a browser application 375, a camera application 376, an alarm application 377, a contacts application 378, a voice dialer application 379, an email application 380, a calendar application 381, a media player application 382, an album application 383, a clock application 384, a health care application (e.g., measure exercise quantity or blood glucose), or environment information (e.g., atmospheric pressure, humidity, or temperature information).

The applications 370 may include an information exchange application supporting information exchange between the electronic apparatus and an external electronic apparatus. The application associated with information exchange may include a notification relay application for forwarding specific information to an external electronic device, or a device management application for managing an external electronic device.

For example, the notification relay application may include a function of delivering, to the external electronic apparatus, notification information generated by other applications (e.g., an SMS/MMS application, an email application, a health care application, an environmental information application, etc.) of the electronic apparatus. Further, the notification relay application may receive notification information from an external electronic device and provide the received notification information to a user.

The device management application may manage (e.g., install, delete, or update) a function for at least a part of the external electronic device communicating with the electronic device (e.g., turning on/off the external electronic device itself (or some elements thereof) or adjusting brightness (or resolution) of a display), applications executed in the external electronic device, or services provided from the external electronic device (e.g., a telephone call service or a message service).

The applications 370 may include applications (e.g., a health care application of a mobile medical appliance or the like) designated according to attributes of the external electronic device. The application 370 may include an application received from the external electronic apparatus. The application 370 may include a preloaded application or a third party application which can be downloaded from the server. Names of the elements of the program module 310 may change depending on the type of OS.

At least some of the program module 310 may be implemented in software, firmware, hardware, or a combination of two or more thereof. At least some of the program module 310 may be implemented (e.g., executed) by a processor (e.g., the processor 210). At least some of the program module 310 may include a module, a program, a routine, a set of instructions, and/or a process for performing one or more functions.

The module or the program module may include one or more elements described above, exclude some of them, or further include other elements. The operations performed by the module, the program module, or other elements may be executed in a sequential, parallel, iterative, or heuristic method. In addition, some operations may be executed in a different order, or may be omitted, or other operations may be added.

Figure 4:
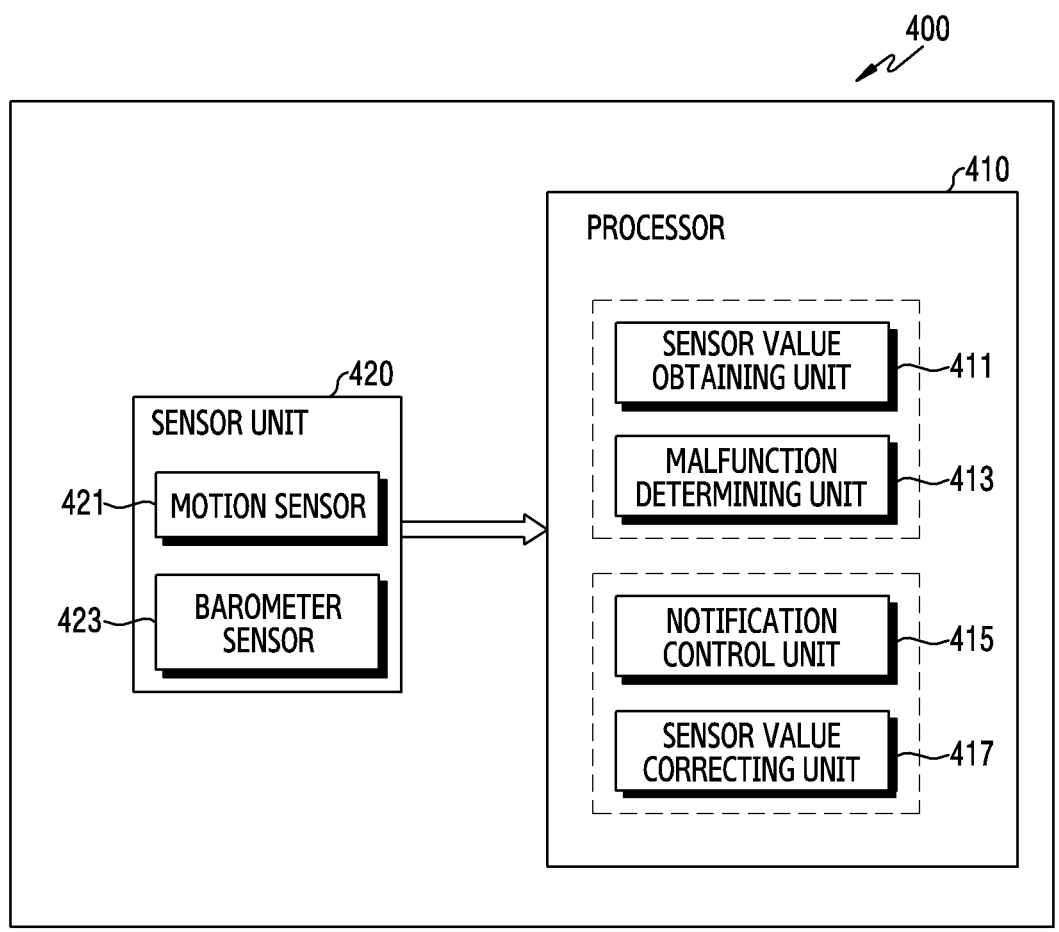
FIG. 4 is a diagram of an electronic device, according to an embodiment.

FIG. 4 is a diagram of an electronic device, according to an embodiment.

Referring to FIG. 4, an electronic device 400, which can include all or some of the components of electronic devices 101/200, may include a processor 410 and a sensor unit 420. The electronic device 400 may be a wearable device, or one of the other previously described electronic devices.

The electronic device 400 may have a water and dust proof structure, and may include a hole exposed to outside, to drive a barometer sensor 423. Alternatively, the electronic device 400 may be formed with a material (e.g., a membrane) that covers (or partially covers) the hole thereby allowing air flow through the hole exposed to the outside. However, if the hole is blocked or contaminated with a foreign substance such as water (e.g., sweat, rain, etc.) or dust, the air may not easily flow through the hole, which, in turn, may result in an inaccurate barometric pressure data measurement. The electronic device 400 may determine whether the barometer sensor 423 malfunctions, using a motion sensor 421.

The processor 410 may determine whether the barometer sensor 423 is functioning normally by analyzing whether a change of motion data corresponds to a change of the barometric pressure data. On a periodic basis, in real time, or if a required condition is satisfied, the processor 410 may determine whether the barometer sensor 423 malfunctions. The processor 410 may include a sensor value obtaining unit 411, a malfunction determining unit 413, a notification control unit 415, and a sensor value correcting unit 417.

The sensor value obtaining unit 411 may obtain sensor data (e.g., the motion data and the barometric pressure data) from the sensor unit 420. The sensor value obtaining unit 411 may obtain the motion data from the motion sensor 421 and obtain the barometric pressure data from the barometer sensor 423, on a periodic basis or in real time. The sensor value obtaining unit 411 may store the obtained motion data and barometric pressure data in a memory associated with the electronic device 400.

The malfunction determining unit 413 may compare the change of the motion data with the motion of the barometric pressure data, using the motion data and the barometric pressure data stored in the memory during a specific time period, and may analyze whether the motion data change corresponds to the barometric pressure data change. For example, the malfunction determining unit 413 may determine whether a correlation between the motion data change and the barometric pressure data change satisfies a designated rule (e.g., direct proportion, inverse proportion, etc.).

If a user goes to an uphill road, the barometric pressure may decrease and the acceleration change (or motion change, acceleration impulse change) may not be great, or may be relatively less when compared to a level or downhill road. If the user goes to a downhill road, the barometric pressure may increase and the acceleration change (or motion change, acceleration impulse change) may be considerable. In this context, the malfunction determining unit 413 may determine whether the barometer sensor 423 malfunctions, based on the correlation between the motion data change and the barometric pressure data change. For example, in response to a small acceleration change and the increasing barometric pressure change, the malfunction determining unit 413 may determine that barometer sensor 423 is malfunctioning. Alternatively, in response to a great acceleration change and the increasing barometric pressure change, the malfunction determining unit 413 may determine that barometer sensor 423 is also malfunctioning. Upon detecting the malfunction of the barometer sensor 423, the malfunction determining unit 413 may provide the malfunction of the barometer sensor 423 to the notification control unit 415 and the sensor value correcting unit 417.

The notification control unit 415 may provide notification information regarding a state of the barometer sensor 423. The notification control unit 415 may provide the notification information, which can include at least one of a text, an image, or a video. For example, the notification control unit 415 may display the notification information through a display of the electronic device 400. The notification control unit 415 may notify of the malfunction of the barometer sensor 423, using vibrations or a sound (e.g., a warning sound). Although not illustrated, the electronic device 400 may further include a motor for outputting vibrations and a speaker for outputting a sound. The notification control unit 415 may control the motor to output the vibrations or control the speaker to output the sound.

If the barometer sensor 423 malfunctions, the sensor value correcting unit 417 may correct the barometric pressure data measured at the barometer sensor 423. For example, the sensor value correcting unit 417 may correct the barometric pressure data using the motion data measured at the motion sensor 421. Based on the motion data, if the barometric pressure data, which is supposed to (or expected to) decrease, increases when measured, the sensor value correcting unit 417 may correct the barometric pressure data to decrease. The sensor value correcting unit 417 may correct the barometric pressure data using sensor data obtained from other sensors (e.g., the motion sensor 421) of the electronic device 400. Alternatively, the sensor value correcting unit 417 may receive barometric pressure data, which is measured at an external device from the external device (e.g., another electronic device, a smart phone) through a communication unit, and the barometric pressure data measured at the electronic device 400 can be corrected or changed using the received barometric pressure data. The external device may be connected to or paired with the electronic device 400.

The sensor value correcting unit 417 may correct the barometric pressure data using a sensor value correcting algorithm. The sensor value correcting algorithm can use calibration, interpolation, and filtering when correcting the barometric pressure data. The sensor value correcting unit 417 may correct and store the barometric pressure data in the memory while the barometer sensor 423 is malfunctioning, or correct the barometric pressure data if the user requests information (e.g., stair climbing information, level information, etc.) of the barometer sensor 423.

The processor 410 may include a first processor and a second processor. The first processor may always operate (e.g., always be activated or enabled) if power is applied to the electronic device 400. The first processor may always wake up while the power is supplied to the electronic device 400 and may receive the sensor data (e.g., the motion data, the barometric pressure data, etc.) from the sensor unit 420. The first processor may include the sensor value obtaining unit 411 and the malfunction determining unit 413. The first processor may always wake up, regardless of an ON/OFF mode of the display of the electronic device 400. The first processor may operate using lower power than the second processor. The first processor may determine the malfunction of the barometer sensor 423 based on the sensor data. The first processor may send the determined information (e.g., the normal function or the malfunction of the barometer sensor 423) to the second processor.

The second processor may selectively operate as necessary or required. For example, the second processor may be activated (e.g., an operation mode) if the display is turned on, information is acquired, or information is scanned. If the display is turned off, the second processor may be deactivated (e.g., may be in a sleep mode). That is, the second processor may be deactivated, and may wake up to activate according to at least one of a periodic basis, a designated scanning cycle, or an application operation cycle (or application information request). The second processor may include the notification control unit 415 and the sensor value correcting unit 417. The second processor may detect a user input through a user input unit, and may obtain communication information through a communication unit.

The sensor unit 420 may sense information measured or detected periodically or in real time. The sensor unit 420 may include the motion sensor 421 and the barometer sensor 423, and the sensor unit 420 may further include other sensors which are not shown in FIG. 4 (e.g., sensors of FIG. 2). The motion sensor 421, which measures a motion, may include an accelerometer sensor and a gyro sensor. Besides the accelerometer sensor or the gyro sensor, the motion sensor 421 may further include various sensors for measuring the motion of the electronic device 400. For example, the accelerometer sensor, which measures acceleration in the x, y, and z axes, may measure a force exerted on the electronic device 400 using the measured acceleration. For example, if the accelerometer sensor detects no motion, a value corresponding to acceleration of gravity is obtained. If a motion is detected, vibrations of the motion may be presented as a change of the force, that is, as an acceleration change. The motion sensor 421 may send the measured motion data to the processor 410 or the sensor value obtaining unit 411.

The barometer sensor 423 may sense an altitude change of the electronic device 400. For example, the barometer sensor 423 may measure whether the user moves toward a relatively high altitude or a relatively low altitude. If the user is moving on an even ground, the motion sensor 421 may detect the motion, but the barometer sensor 423 may not detect the altitude change (e.g., no change in the barometric pressure data). When stair climbing/descending or hiking, the motion sensor 421 may detect the motion, and the barometer sensor 423 may detect the altitude change (e.g., a change in the barometric pressure data). The barometer sensor 423 may send the measured barometric pressure data to the processor 410 or the sensor value obtaining unit 411.

The processor 400 may display notification information (e.g., a guide message for notifying of the malfunction) of a state of the barometer sensor 423 or information (e.g., health information, level information, etc.) of the barometer sensor 423, on a display (of the electronic device 400. The processor 400 may forward the notification information of the state of the barometer sensor 423 to an external device (e.g., a smart phone, a server, etc.) using at least one of the previously described communication schemes (e.g., BT, WiFi, NFC, or cellular).

The electronic device may include a barometer sensor for measuring a barometric pressure of the electronic device, a motion sensor for detecting a motion of the electronic device, and a processor, wherein the processor is configured to obtain first data regarding a barometric pressure change using the barometer sensor, to obtain second data regarding the motion of the electronic device using the motion sensor while the first data is obtained, and if the first data corresponds to the second data, to determine the first data as data corresponding to the barometric pressure.

If the first data does not correspond to the second data, the processor may be configured to provide notification information regarding a state of the barometer sensor.

The processor may be configured to detect a user feedback after the notification information is provided, if the user feedback is detected, to obtain third data regarding the barometric pressure change using the barometer sensor, to obtain fourth data regarding the motion of the electronic device using the motion sensor while the third data is obtained, and to determine whether the third data corresponds to the fourth data.

The processor may be configured to, as at least part of providing the notification information, identify a time length where the first data does not correspond to the second data, and to determine at least one of first notification information and second notification information as the notification information, based at least on the identified time length. The processor may be configured to determine the correspondence if a correlation of the first data and the second data satisfies a designated rule.

The processor may be configured to update a stair climbing value of the electronic device, based at least on the determined data corresponding to the barometric pressure.

The processor may be configured to, if the motion of the electronic device is detected using the motion sensor, obtain the first data or the second data.

The processor may be configured to determine a situation of the electronic device using the second data obtained from the motion sensor or data obtained from an external device connected with the electronic device, to determine a barometric pressure interval value based at least on the determined situation, and to determine the first data as the data corresponding to the barometric pressure, based at least on whether a change of the first data falls within the barometric pressure interval value.

The processor may be configured to determine whether to correct the first data if a request for information of the first data is received, and to provide the first data information by correcting the first data based at least on the determination.

The electronic device may further include a communication unit for receiving at least one radio signal, wherein the processor is configured to determine the motion of the electronic device if a strength of the radio signal changes, and to determine whether the first data corresponds to the second data.

Figure 5:
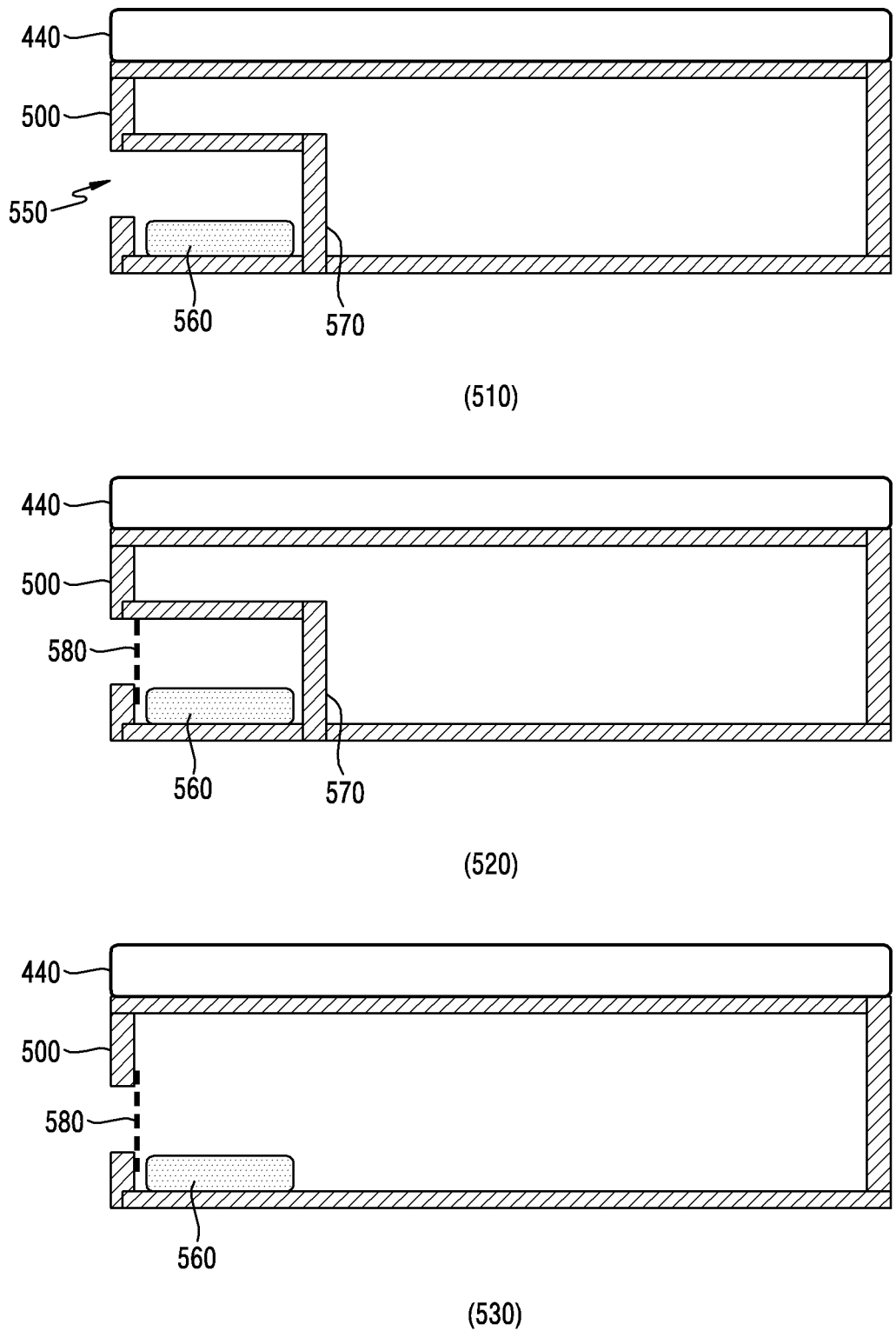
FIG. 5 is a diagram of e a hole exposed to an outside and formed in an electronic device, according to an embodiment.

FIG. 5 is a diagram of a hole exposed to an outside and formed in an electronic device, according to an embodiment.

Referring to FIG. 5, the electronic device 400 according to a first embodiment 510 may include a display 440 mounted on a housing 500, and an external hole 550 and a barometer sensor 560 inside the housing 500. The barometer sensor 560 may be a water-proof sensor. The housing 500 may include a shield wall 570 for preventing a foreign substance (e.g., water, dust, etc.) from entering the housing 500 through the external hole 550.

An electronic device 400 according to a second embodiment 520 may include the display 440 mounted on the housing 500, and a material 580 interposed between the outside and the external hole 550, the barometer sensor 560, and the shield wall 570 inside the housing 500. The barometer sensor 560 may not be water-resistant, and the material 580 may selectively allow a particular material to pass. For example, the material 580 may block the foreign substance, such as water, from entering through the external hole 550 and may allow air to pass therethrough, and may be, for example, a membrane.

An electronic device 400 according to a third embodiment 530 may include the display 440 mounted on the housing 500, and the material 580 interposed between the outside and the external hole 550 and a barometer sensor 560 inside the housing 500. The barometer sensor 560 may not be water-resistant, and does not include the shield wall 570.

Figure 6:
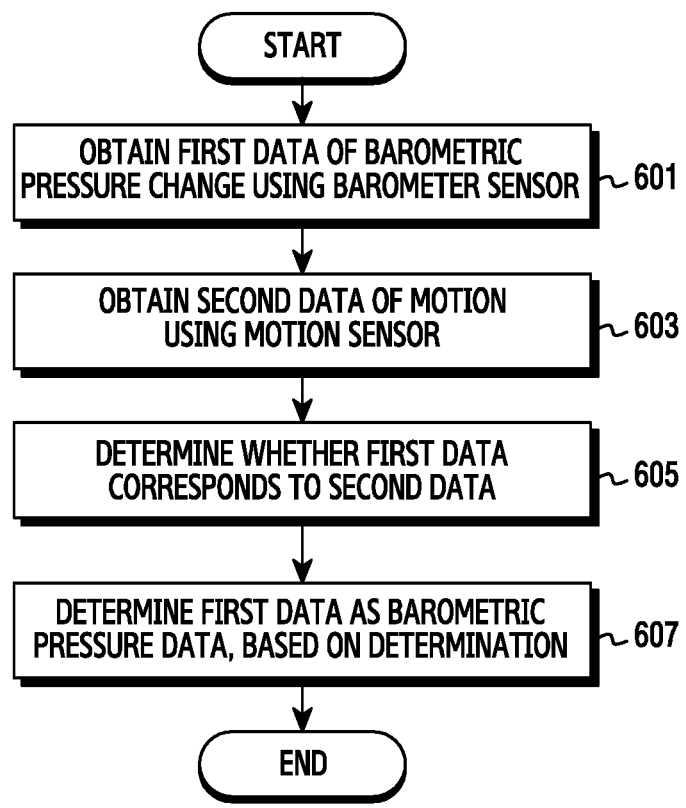
FIG. 6 is a flowchart of a method of an electronic device, according to an embodiment.

FIG. 6 is a flowchart of a method of an electronic device, according to an embodiment.

Referring to FIG. 6, in step 601, the processor 410 of the electronic device 400 may obtain first data regarding a barometric pressure change, using the barometer sensor 423. The processor 410 or the sensor value obtaining unit 411 may receive the barometric pressure data from the barometer sensor 423 in real time, on a periodic basis, or as necessary, and store the received barometric pressure data in a memory of the electronic device 400. The processor 410 may calculate first data of the barometric pressure data using barometric pressure data acquired for a specific time (e.g., 10 seconds, 20 seconds, etc.). The first data may include a change indicating whether the barometric pressure increases or decreases.

In step 603, the processor 410 may obtain second data regarding a motion, using the motion sensor 421. The processor 410 or the sensor value obtaining unit 411 may receive the motion data from the motion sensor 421 in real time, on a periodic basis, or as necessary, and store the received motion data in the memory. The processor 410 may calculate second data of the motion using motion data acquired for a specific time (e.g., 10 seconds, 20 seconds, etc.). The second data may include a motion change indicating whether the motion is considerable (relatively large or relatively small).

While step 601 is shown preceding step 603 in FIG. 6, step 603 may precede step 601. Alternatively, step 601 and step 603 may be performed at the same time.

In step 605, the processor 410 may determine whether the first data corresponds to the second data. The processor 410 or the malfunction determining unit 413 may analyze whether a correlation between the first data and the second data corresponds to a designated rule (e.g., a proportional relation, an inversely proportional relation, a preset pattern, etc.). If the second data is detected with no motion (e.g., a stationary state), the barometric pressure change may not detected, or the barometric pressure change may not be considerable. However, if the barometer sensor 423 malfunctions and no motion is detected, a considerable barometric pressure change may be detected.

Alternatively, if the second data is detected with a significant motion (e.g., a great or a relatively large motion change per hour), the barometric pressure change may increase, or the barometric pressure change may be significant. However, if the barometer sensor 423 malfunctions, the barometric pressure change may be relatively small or may decrease.

Alternatively, if the second data is detected with a relatively small motion (e.g., a relatively small motion change per hour), the barometric pressure change may decrease or be considerable. However, if the barometer sensor 423 malfunctions, the barometric pressure change may be relatively small or increase.

Based on the correlation between the first data and the second data, the processor 410 may determine whether the first data corresponds to the second data. The correlation may be related to a proportional relation, an inversely proportional relation, or a preset pattern between the first data and the second data.

In step 607, the processor 410 may determine the first data as the barometric pressure data, based on the determination. If the first data corresponds to the second data (e.g., if the barometer sensor 423 is functioning normally), the processor 410 or the malfunction determining unit 413 may determine the first data as data corresponding to a barometric pressure. The processor 410 may update a stair ascend value of the electronic device 400 with the first data. For example, the processor 410 may provide the information (e.g., health information, level (stair) information, barometric pressure information, etc.) of the barometer sensor 423 using the barometric pressure data stored in the memory without correcting the barometric pressure data.

The processor 410 or the notification control unit 415 may provide notification information of the state of the barometer sensor 423, if the first data does not correspond to the second data (e.g., if the barometer sensor 423 malfunctions). The notification information may include at least one of a text, an image, or a video, for notifying the user of the malfunction of the barometer sensor 423. The processor 410 may output vibrations or a sound when providing the notification information. The processor 410 or the sensor value correcting unit 417 may correct the barometric pressure data acquired during the malfunction of the barometer sensor 423, in various manners. Alternatively, the processor 410 may include a flag indicating an error in the barometric pressure data obtained during the malfunction of the barometer sensor 423.

The processor 410 or the sensor value correcting unit 417 may provide the information (e.g., health information, level information, etc.) of the barometer sensor 423 by correcting the barometric pressure data including the flag in the barometric pressure data stored in the memory.

Figure 7A:
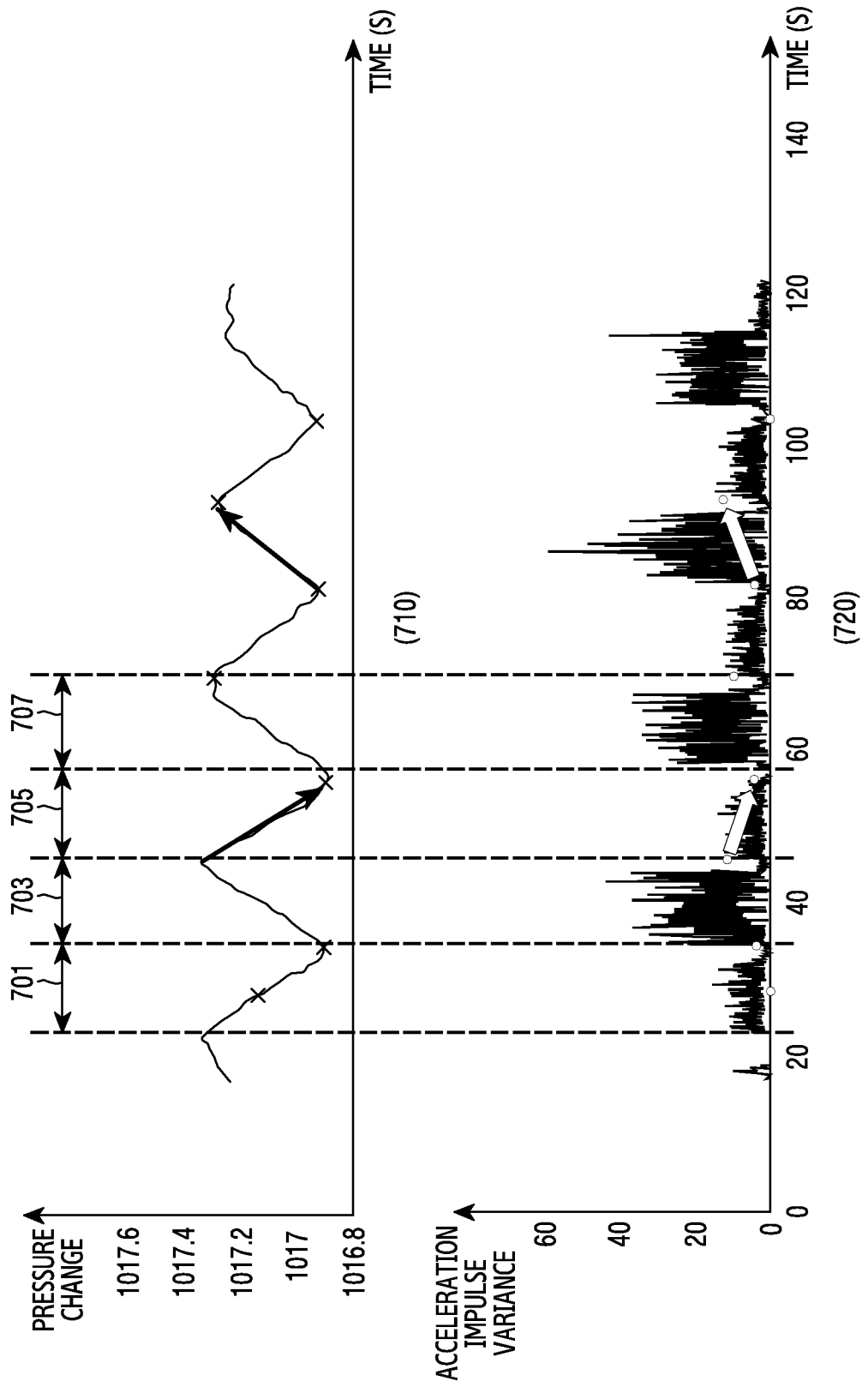
FIGS. 7A and 7B are graphs of a correlation between a barometric pressure change and an acceleration impulse variance, according to an embodiment.
Figure 7B:
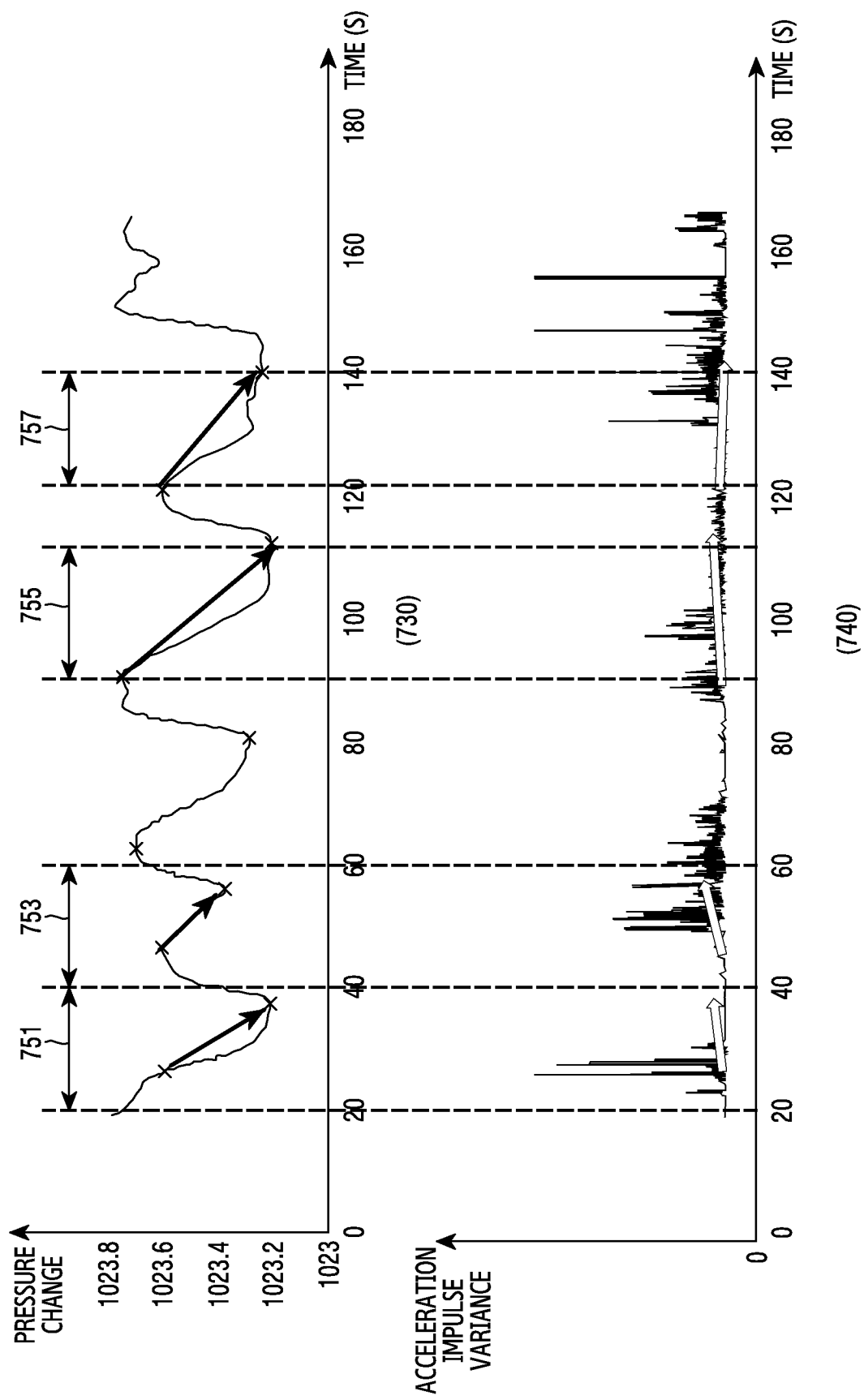

FIGS. 7A and 7B are graphs of a correlation between a barometric pressure change and an acceleration impulse variance, according to an embodiment.

FIG. 7A depicts a proportional relation between the barometric pressure change and the acceleration impulse variance.

Referring to FIG. 7A, the processor 410 may obtain a barometric pressure change and a motion change based on a user's motion during a specific time. A barometric pressure change graph 710 may be used to indicate the barometric pressure change, and an acceleration change graph 720 may be used to indicate an acceleration impulse variance. The acceleration impulse variance is the change of the impulse measured using an accelerometer sensor, and may be a magnitude of the acceleration value greater than zero. The acceleration impulse variance may indicate the motion change. Changes of the variance may indicate a distribution by leveling the acceleration impulse distribution during a specific time period. For example, if the acceleration impulse variance is distributed between 0 and 20, the variance may decrease. If the acceleration impulse variance is distributed between 0 and 60, the variance may increase.

In the barometric pressure change graph 710 and the acceleration change graph 720, the barometric pressure change and the acceleration impulse variance establish a specific correlation in the same time period. For example, the user may go uphill in a first interval 701 and a third interval 705, and go downhill in a second interval 703 and a fourth interval 707. In the first interval 701 and the third interval 705, the barometric pressure change decreases in the barometric pressure change graph 710 and the acceleration impulse variance is relatively small in the acceleration change graph 720. In the second interval 703 and the fourth interval 707, the barometric pressure change increases in the barometric pressure change graph 710 and the acceleration impulse variance is relatively great in the acceleration change graph 720.

That is, if the user goes uphill, the barometric pressure may decrease in proportion to the ascending height and the acceleration impulse variance, thereby indicating that the user's motion may be detected with a relatively low value (e.g., a small motion), compared with the walking on even ground. Conversely, if the user goes downhill, the barometric pressure may increase in proportion to the descending height and the acceleration impulse variance may be detected with a relatively high value (e.g., a great or large motion), compared with the walking on even ground. For example, if the user goes downhill, he/she may move faster than uphill, and thus the motion change may be considerable. In walking uphill, the impulse when the user takes steps may be relatively greater than the impulse detected in walking downhill. Since the user descends the downhill toward the gravity, stepping may add the impulse of the gravity.

Hence, the acceleration change may be relatively small if the barometric pressure change decreases, and the acceleration change may be relatively great if the barometric pressure change increases. The processor 410 may analyze the correlation between the barometric pressure data change and the motion data change.

FIG. 7B does not depict the proportional relation between the barometric pressure change and the acceleration impulse variance.

Referring to FIG. 7B, a barometric pressure change graph 730 may be used to indicate the barometric pressure change, and the acceleration change graph 740 may be used to indicate the acceleration impulse variance. The barometric pressure change graph 730 and the acceleration change graph 740 do not indicate the correlation between the barometric pressure change and the acceleration impulse variance during the same time period. For example, in the barometric pressure change graph 730, the barometric pressure change reduces in a first interval 751, a second interval 753, a third interval 755, and a fourth interval 757. Conversely, in the acceleration change graph 740, the acceleration change may increase in the first interval 751, the second interval 753, and the third interval 755 and decrease in the fourth interval 757. That is, if the barometric pressure falls in the first interval 751 through the fourth interval 757, the acceleration impulse variance is supposed to or expected to increase. However, since the acceleration impulse variance increases in the first interval 751, the second interval 753, and the third interval 755, but reduces in the fourth interval 757, the malfunction of the barometer sensor 423 may be determined. For example, if the barometer sensor 423 functions normally, no barometric pressure change may be detected in a stationary state or the barometric pressure change may not be considerable. However, the barometric pressure decreases in the barometric pressure change graph 730. In this case, the processor 410 may determine a malfunction of the barometer sensor 423. The processor 410 may ignore the barometric pressure data detected in the stationary state, or may remove the barometric pressure data from the memory.

The correlation between the barometric pressure change and the motion change may be used for various categories and criteria. For example, situation estimation sensitivity may be adjusted according to whether the acceleration impulse variance exceeds, equals, or falls below a threshold. If the acceleration impulse variance exceeds the thresholds in the first interval 751, the second interval 753, and the third interval 755, the processor 410 may determine the normal operation of the barometer sensor 423. Alternatively, the processor 410 may observe the correlation of the barometric pressure change and the acceleration change in a specific time period (e.g., the first interval 751, the second interval 753, and the third interval 755), and may determine a malfunction of the barometer sensor 423 in the fourth interval 757 if the barometric pressure change and the acceleration change do not reveal the correlation in the fourth interval 757.

Figure 8:
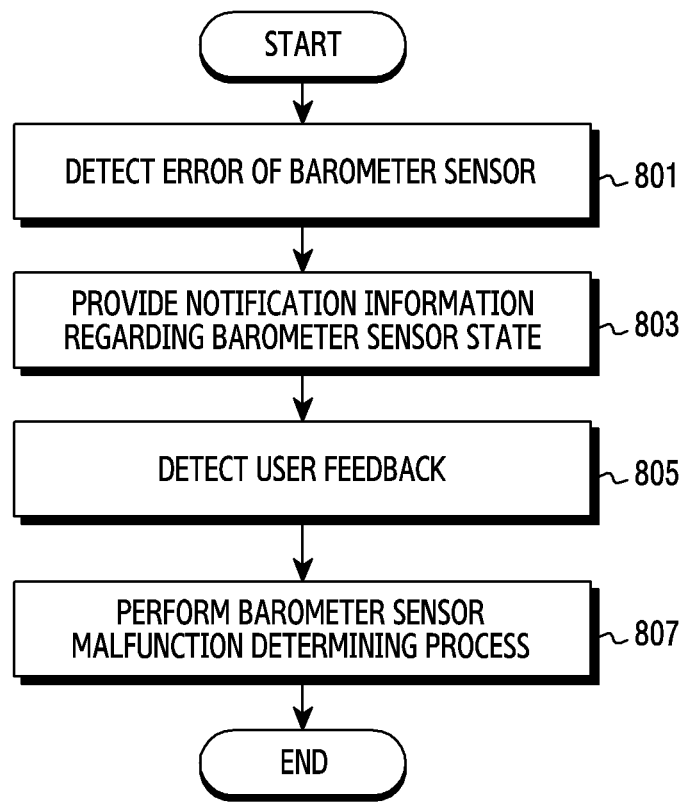
FIG. 8 is a flowchart of a method for providing notification information regarding a barometer sensor, according to an embodiment.

FIG. 8 is a flowchart of a method for providing notification information regarding a barometer sensor, according to an embodiment. FIG. 8 depicts a detailed subroutine if the first data does not correspond to the second data in step 605.

Referring to FIG. 8, in step 801, the processor 410 may detect an error of the barometer sensor 423. The processor 410 or the malfunction determining unit 413 may determine the error (e.g., a malfunction) in the barometer sensor 423 in step 801 if the first data does not correspond to the second data in step 605.

In step 803, the processor 410 may provide notification information regarding the state of the barometer sensor. The processor 410 or the notification control unit 415 may provide the notification information including at least one of a text, an image, or a video. The notification information may indicate the error of the barometer sensor 423, or may guide (or recommend) the user through an action for the normal operation of the barometer sensor 423. For example, the processor 410 may display the notification information through a display of the electronic device. In addition, the processor 410 may notify of the malfunction of the barometer sensor 423 using vibrations or a sound (e.g., a warning sound).

In step 805, the processor 410 may detect user feedback. The user feedback may indicate that the user identifies the notification information, e.g., by waving the electronic device 400 or shaking the electronic device 400. If the user shakes the electronic device 400, the processor 410 may detect the user feedback using the motion sensor 421 of the electronic device 400. For example, if the user shakes the electronic device 400, a gyro sensor may detect rotations of the electronic device 400 and an accelerometer sensor may detect the motion.

In step 807, the processor 410 may perform a barometer sensor malfunction determining process/operation. The barometer sensor malfunction determining process may re-determine whether the barometer sensor 423 functions normally after the user feedback. For example, the barometer sensor malfunction determination process may determine whether the barometer sensor 423 functions normally, using the motion sensor 421. The barometer sensor malfunction determination process may include all or some of the steps of FIG. 6.

Figure 9:
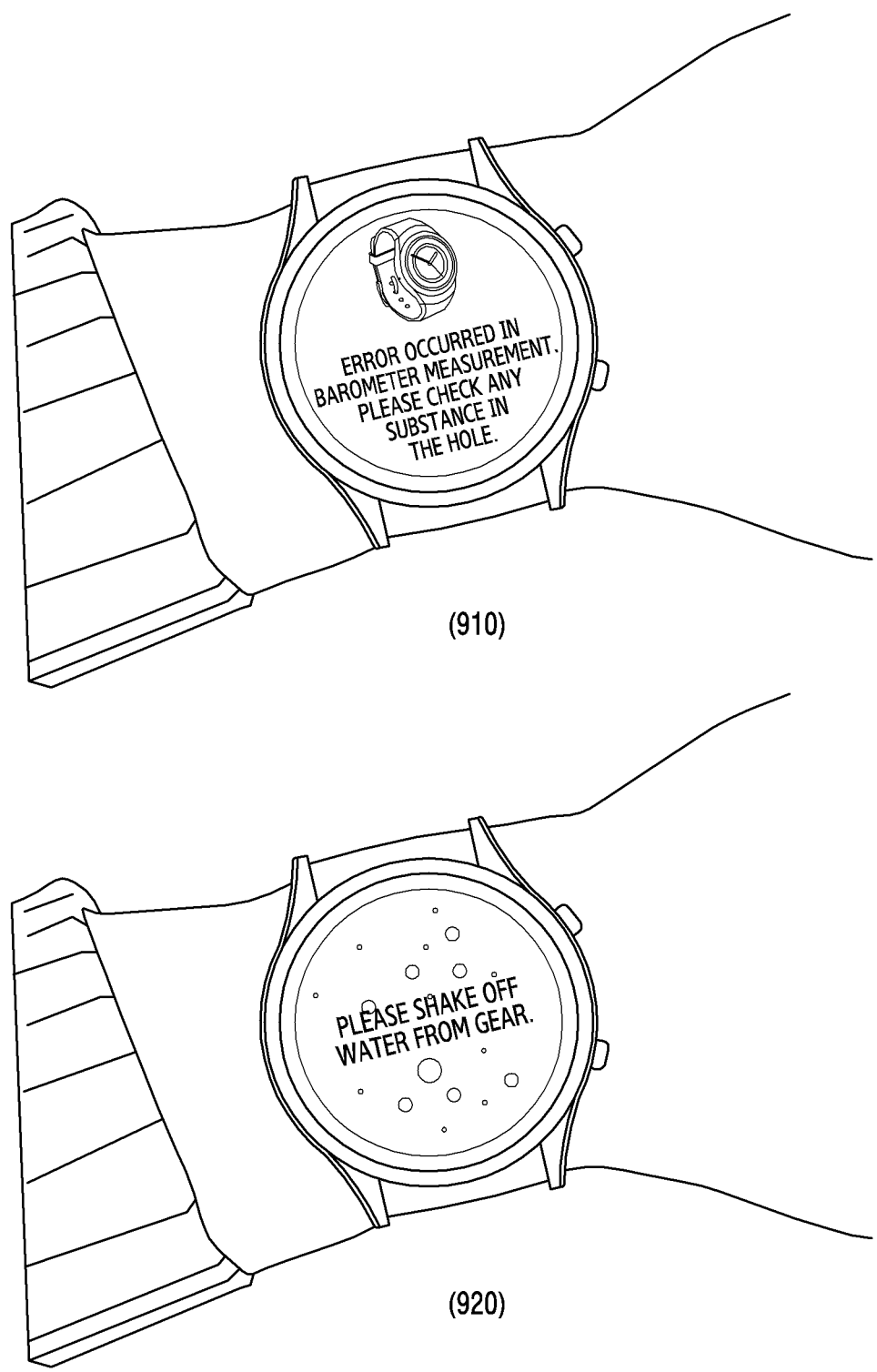
FIG. 9 is a diagram of providing notification information regarding a barometer sensor, according to an embodiment.

FIG. 9 is a diagram for providing notification information regarding a barometer sensor, according to an embodiment.

Referring to FIG. 9, if detecting an error of a barometer sensor (e.g., using the barometer sensor 423), the processor 410 may provide notification information (e.g., a first guide message 910 or a second guide message 920) regarding a state of the barometer sensor. The first guide message 910 may include a text (e.g., "Error occurred in barometer measurement. Please check any substance in the hole") for guiding or displaying the error of the barometer sensor 423 and an image (e.g., a wearable device photo/image). Alternatively, the second guide message 920 may include a text (e.g., "Please shake off water from Gear") for guiding the user through an action for operating the barometer sensor 423. The processor 410 may provide the first guide message 910 or the second guide message 920 based on the malfunction time of the barometer sensor 423. For example, the processor 410 may provide the second guide message 920 if the barometer sensor 423 malfunctions for a short time, and may provide the first guide message 910 if the barometer sensor 423 malfunctions for a long time, or vice versa.

Figure 10:
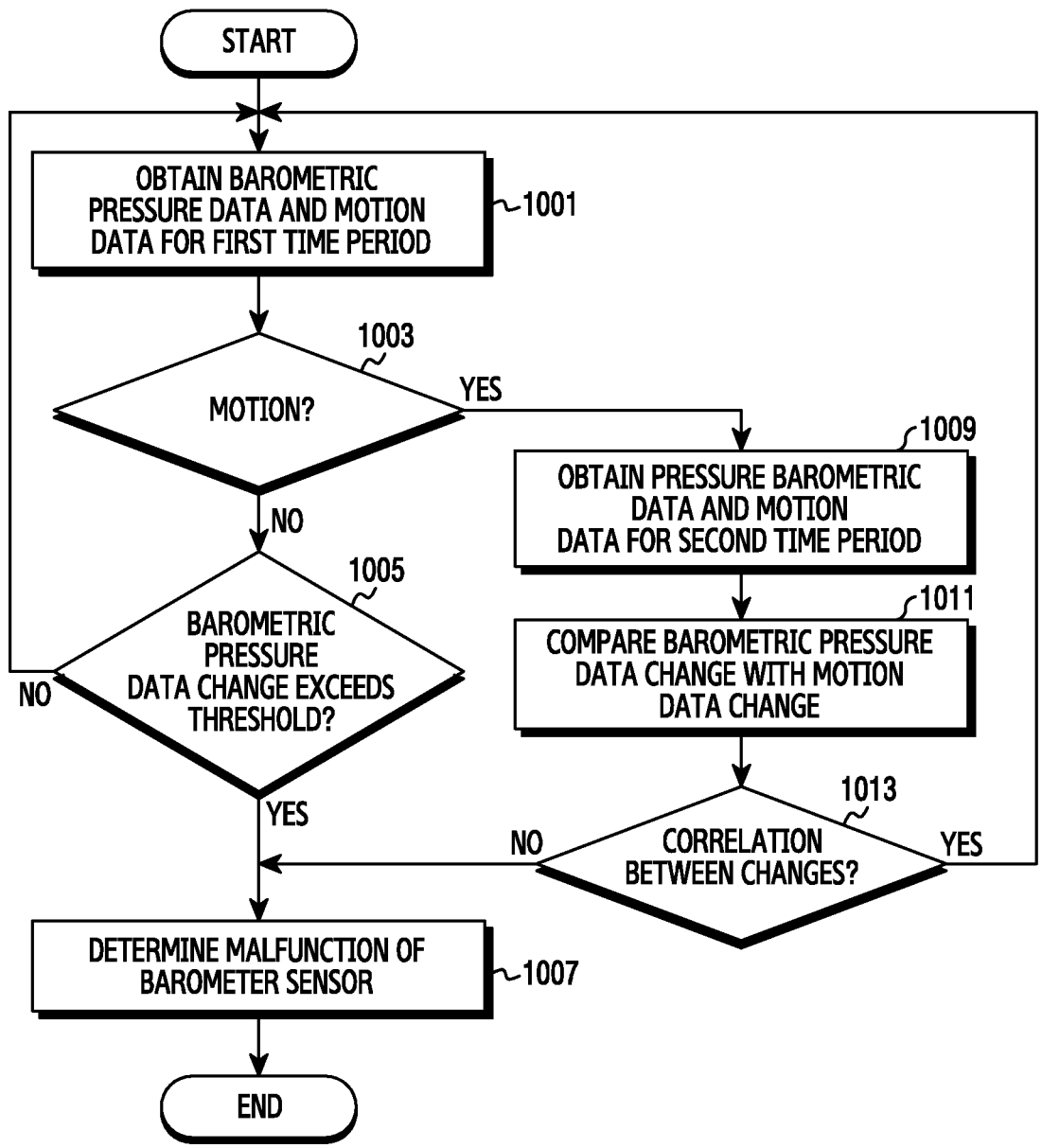
FIG. 10 is a flowchart of a method for determining malfunction of a barometer sensor, according to an embodiment.

FIG. 10 is a flowchart of a method for determining malfunction of a barometer sensor, according to an embodiment.

Referring to FIG. 10, in step 1001, the processor 410 may obtain barometric pressure data and motion data for a first time period. The first time period may be a time defined by the user or a default time of the electronic device 400, such as 10 seconds or 20 seconds. Alternatively, the processor 410 or the sensor value obtaining unit 411 may set the first time period by considering a detection time of the barometric pressure data and a detection time of the motion data. For example, if the barometric pressure data is detected every three seconds and the motion data is detected every second, the processor 410 may determine the first time period as 10 seconds. The processor 410 may store the barometric pressure data and the motion data obtained for the first time period, in the memory.

In step 1003, the processor 410 may determine whether there is any motion. The processor 410 or the malfunction determining unit 413 may determine whether there is any motion, using the motion data obtained in the first time period. In response to the motion, the processor 410 may perform step 1009. In response to no motion, the processor 410 may perform step 1005.

In response to no motion, the processor 410 may determine whether a change of the barometric pressure data in the first time period exceeds a threshold in step 1005. With no motion (e.g., in a stationary state), the change of the barometric pressure data may not be considerable. If the user is stationary or walks or runs on an even ground, the barometric pressure data change may be detected within a predetermined threshold or value, e.g., one level or floor of a building. For example, by considering a height of one level of the building, the processor 410 may set the threshold (e.g., 0.26 hectopascal (hpa)). The processor 410 or the malfunction determining unit 413 may perform step 1007 if the barometric pressure data change exceeds the threshold, and return to step 1001 if the barometric pressure data change falls below the threshold. The processor 410 may determine whether the barometer sensor 423 malfunctions, in real time, on a periodic basis, or as necessary.

If the barometric pressure data change exceeds the threshold, the processor 410 may determine a malfunction of the barometer sensor 423 in step 1007. Upon determining the malfunction of the barometer sensor 423, the processor 410 may perform all or some of the steps of FIG. 8.

In response to the motion, the processor 410 may obtain barometric pressure data and motion data for a second time period in step 1009. The second time period may indicate or be a time after the first time period. The second time period may be the same as or different from the first time period. For example, the second time period may be greater or less than the first time period. If the first time period is 20 seconds, the second time period may be 15 seconds or 25 seconds. The processor 410 or the sensor value obtaining unit 411 may store the barometric pressure data and the motion data acquired for the second time period, in the memory.

In step 1011, the processor 410 may compare a barometric pressure data change with a motion data change. The processor 410 or the malfunction determining unit 413 may calculate the barometric pressure data change, using the barometric pressure data of the first time period and the barometric pressure data of the second time period. The processor 410 may calculate the motion data change, using the motion data of the first time period and the motion data of the second time period.

In step 1013, the processor 410 may determine whether the changes establish a correlation. For example, the processor 410 or the malfunction determining unit 413 may determine whether the barometric pressure data change establishes a specific correlation with the motion data change. The processor 410 may return to step 1001 if the barometric pressure data change correlates with the motion data change, and perform step 1007 if the barometric pressure data change does not correlate with the motion data change. The processor 410 may determine whether the barometer sensor 423 malfunctions, in real time, on a periodic basis, or as necessary.

Figure 11:
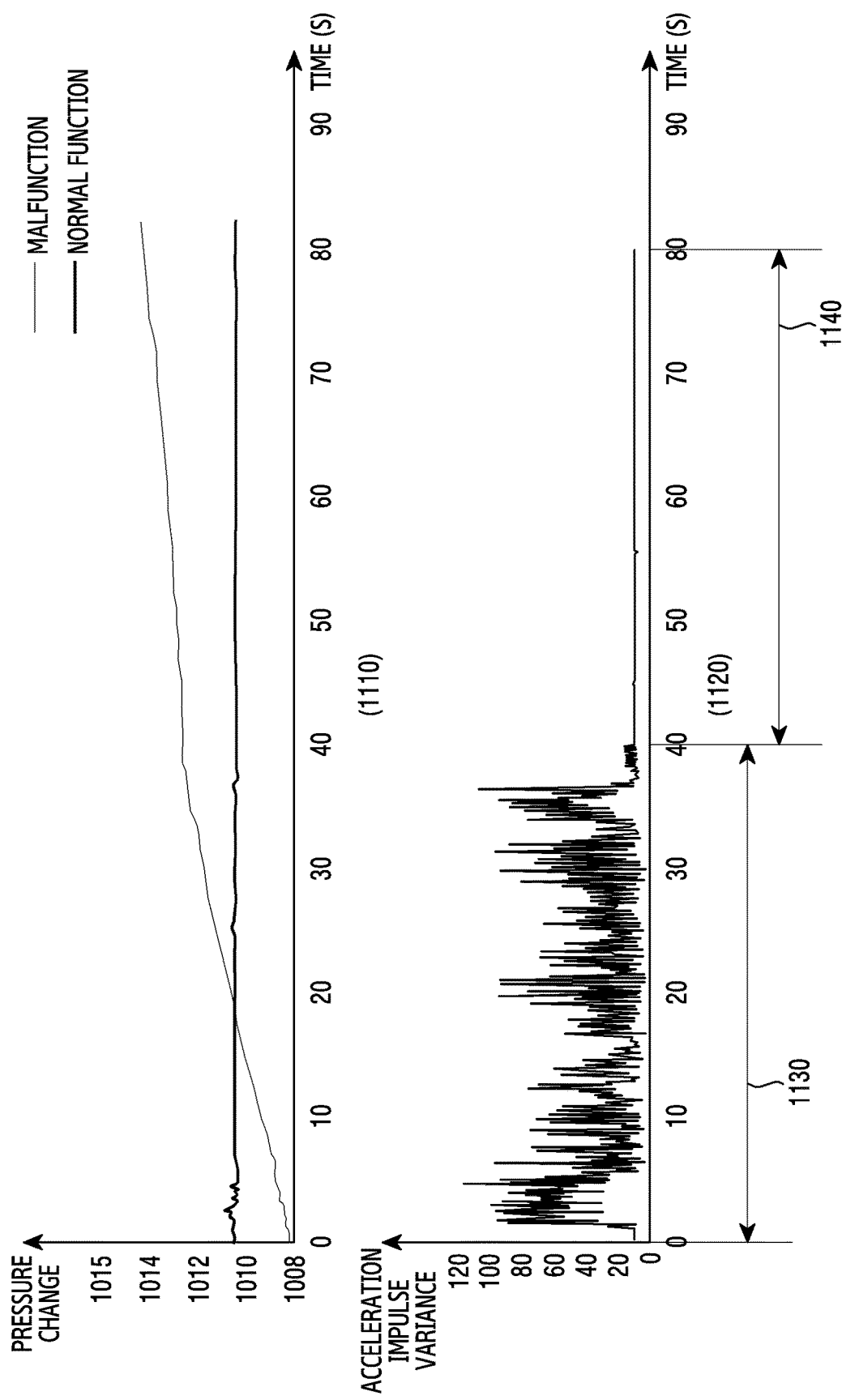
FIG. 11 is a diagram of a barometric pressure change and an acceleration impulse variance in malfunction of a barometer sensor, according to an embodiment.

FIG. 11 is a diagram of a barometric pressure change and an acceleration impulse variance in malfunction of a barometer sensor, according to an embodiment.

Referring to FIG. 11, the processor 410 may obtain a barometric pressure change using a barometric pressure change graph 1110 and an acceleration impulse variance using an acceleration change graph 1120, if the user wears the electronic device 400, waves his/her arm several times (e.g., during a first time period 1130), unties the electronic device 400, and leaves the electronic device 400 on a shelf such as a desk (e.g., during a second time period 1140).

In the barometric pressure change graph 1110, a first trend line (e.g., a thin line) may indicate the barometric pressure change if the barometer sensor 423 malfunctions, and a second trend line (e.g., a thick line) may indicate the barometric pressure change if the barometer sensor 423 functions normally.

In the acceleration change graph 1120, the user waves the electronic device 400 in the first time period 1130 and the motion sensor 421 may detect the motion. However, if the electronic device 400 is left alone in the second time period 1140, the motion sensor 421 may detect no motion. If the motion of the electronic device 400 is not detected (e.g., during the second time period 1140) and the barometer sensor 423 functions normally, the barometric pressure change may be hardly/barely detected (e.g., as indicated by the second trend line). However, if the barometer sensor 423 malfunctions, the barometric pressure change continues to increase (e.g., as indicated by the first trend).

If the material of the external hole of the electronic device 400 is wet due to water or the external hole is clogged with a foreign substance, the air entering through the external hole may be interrupted and the data measured at the barometer sensor 423 may be inaccurate. For example, the motion data detected at the motion sensor 421 may establish a specific correlation with the barometric pressure data detected at the barometer sensor 423. For example, if the user climbs stairs and/or takes steps, the impulse is not relatively great. If the user steps down stairs by gravity, the impulse may increase by the gravity. If the sensor value of the barometer sensor 423 changes considerably with no great change in the sensor value of the motion sensor 421, other external factors may be involved. For example, the air flow into the barometer sensor 423 may be interrupted or an air temperature may change. Hence, the processor 410 may determine whether the barometer sensor 423 malfunctions, based on the correlation between the motion sensor 421 and the barometer sensor 423.

Figure 12:
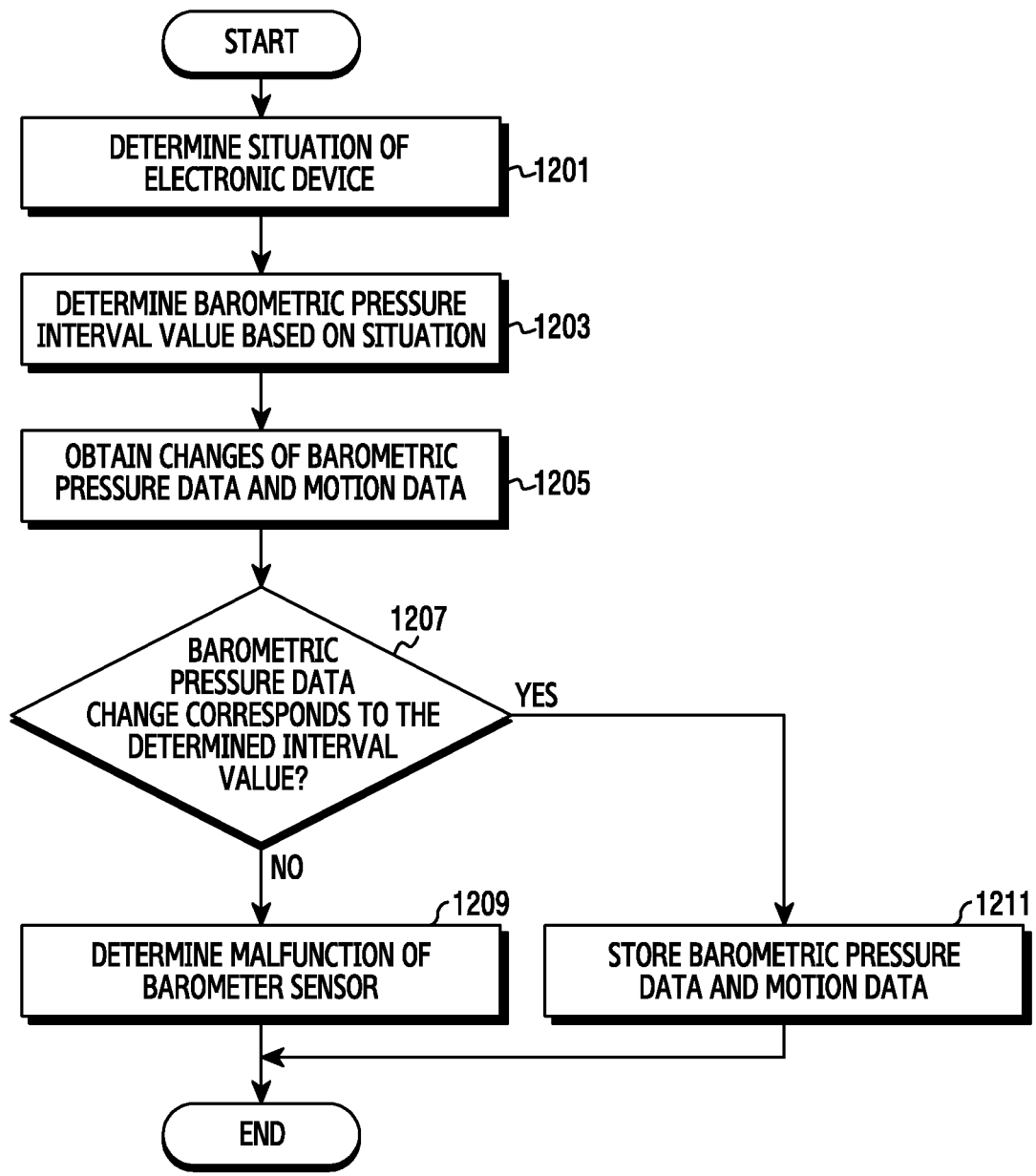
FIG. 12 is a flowchart of a method for determining a threshold of a barometer sensor of an electronic device, according to an embodiment.

FIG. 12 is a flowchart of a method for determining a threshold of a barometer sensor according to a situation of an electronic device, according to an embodiment.

Referring to FIG. 12, in step 1201, the processor 410 may determine a situation of the electronic device 400. For example, the situation of the electronic device 400 may be determined using data detected at various sensors of the electronic device 400 or data received from an external device connected (or paired) with the electronic device 400. The situation of the electronic device 400 may include at least one of a motion state, a stationary state, an ambient temperature state, an ambient noise state, or an inflow air level, or a combination of two or more of them.

In step 1203, the processor 410 may determine a barometric pressure interval value based on the determined situation. The barometric pressure interval value of the motion state may be 0.26 hpa, and the barometric pressure interval value of the stationary state may be 0.15 hpa. Alternatively, if the ambient temperature exceeds 25 degrees, the barometric pressure interval value may be 0.26 hpa. If the ambient temperature falls below 25 degrees, the barometric pressure interval value may be 0.3 hpa.

The barometric pressure interval value may be 0.26 hpa if the ambient noise exceeds 60 dB, the barometric pressure interval value may be 0.2 hpa if the ambient noise ranges 60 dB to approximately 55 dB, and the barometric pressure interval value may be 0.3 hpa if the ambient noise ranges 55 dB to approximately 40 dB.

If the inflow air level falls below 10 m/s, the barometric pressure interval value may be 0.26 hpa, and if the inflow air level exceeds 10 m/s, the barometric pressure interval value may be 0.3 hpa.

The above values are presented for illustrative purposes, and the disclosure is not so limited.

The processor 410 may determine the barometric pressure interval value by collectively considering at least one of the motion state, the stationary state, the ambient temperature state, the ambient noise state, or the inflow air level, or a combination thereof.

In step 1205, the processor 410 may obtain changes of barometric pressure data and motion data. The processor 410 may calculate the barometric pressure change and the motion change using the barometric pressure data and the motion data acquired for a specific time period (e.g., 10 seconds, 20 seconds, etc.). Step 1205 may follow step 1201 and step 1203, or may be performed together with step 1201 and step 1203.

In step 1207, the processor 410 may determine whether the barometric pressure data change corresponds to the determined barometric pressure interval value. In some situations, the motion change measured at the motion sensor 421 and the barometric pressure change measured at the barometer sensor 423 may exhibit different correlations. For example, if the identical barometric pressure interval value is applied regardless of the current situation, a malfunction of the barometer sensor 423 may be determined. Thus, by applying different barometric pressure interval values according to a specific situation, the processor 410 may more accurately determine whether the barometer sensor 423 malfunctions, based on the error range. Step 1207 may be performed together with step 605 of FIG. 6.

The processor 410 may perform step 1211 if the barometric pressure data change falls within the determined barometric pressure interval value, and perform step 1209 if the barometric pressure data change does not fall within the determined barometric pressure interval value.

In step 1209, the processor 410 may determine the malfunction of the barometer sensor 423. If determining the malfunction of the barometer sensor 423, the processor 410 may perform the steps of FIG. 8. For example, in response to the malfunction of the barometer sensor 423, the processor 410 may perform steps 803, 805, and 807 of FIG. 8.

In step 1211, the processor 410 may store the barometric pressure data and the motion data in the memory. The barometric pressure data and the motion data stored in the memory may be used to provide information of the barometer sensor 423 or information of the motion sensor 421.

Figure 13:
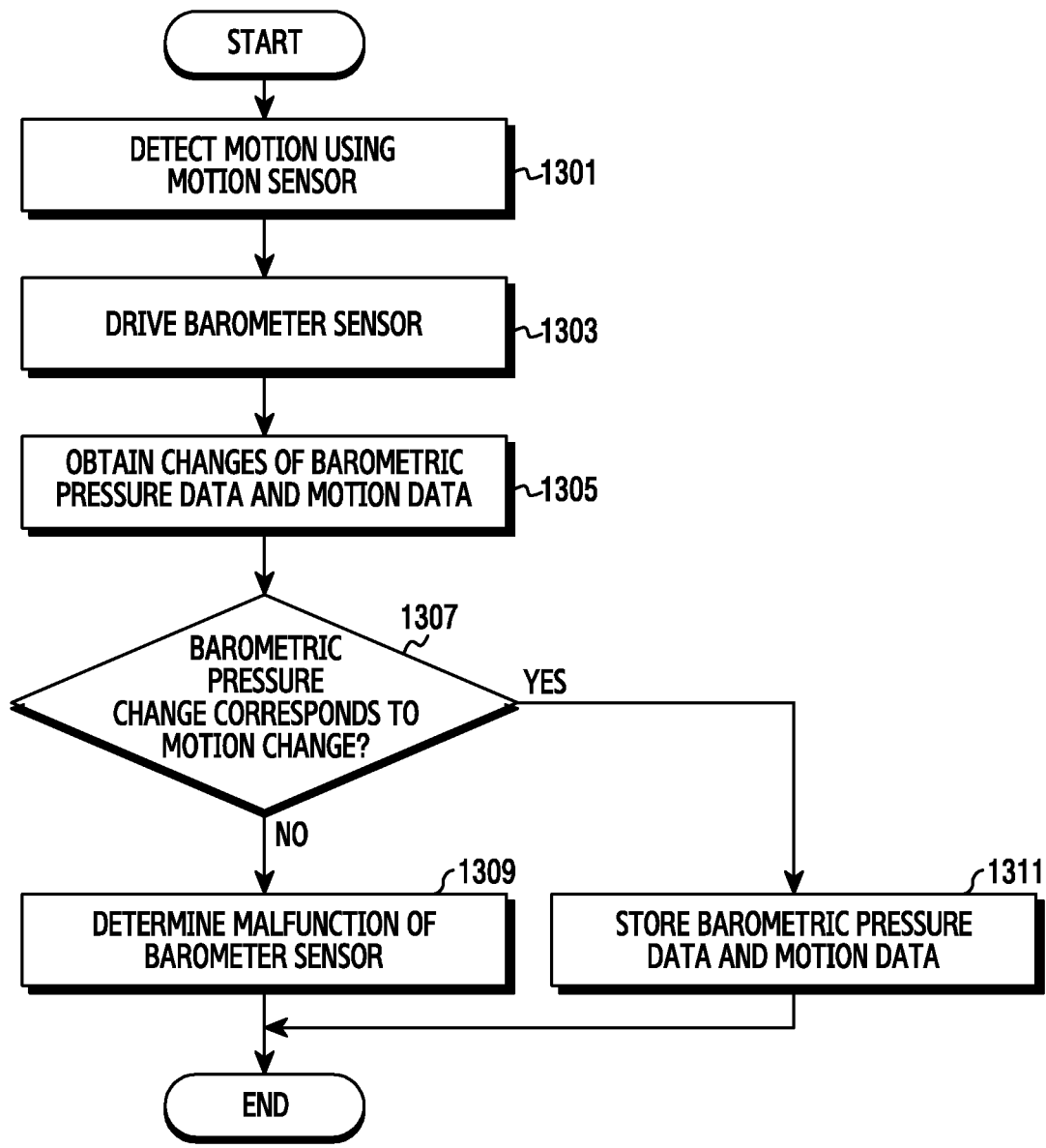
FIG. 13 is a flowchart of a method for driving a barometer sensor in response to a motion detected, according to an embodiment.

FIG. 13 is a flowchart of a method for driving a barometer sensor in motion detection, according to an embodiment.

Referring to FIG. 13, in step 1301, the processor 410 may detect a motion using the motion sensor 421. In response to no motion being detected, the user may not be using (or wearing) the electronic device 400. Alternatively, if the user uses the electronic device 400 but the motion falls below a threshold, such a motion may be meaningless or insignificant.

Power required to drive sensors of the electronic device 400 may be low, but the electronic device 400 is driving a sensor to collect a user's life pattern or health information. If the meaningless motion is detected, there is no need to drive the sensor. The processor 410 may selectively drive the barometer sensor 423 only if the motion sensor 421 detects the motion.

In response to the detected motion, the processor 410 may drive the barometer sensor 423 in step 1303. The barometer sensor 423 may detect an altitude change of the electronic device 400 under the control of the processor 410. The processor 410 may obtain the barometric pressure data from the barometer sensor 423 in step 1303.

In step 1305, the processor 410 may obtain changes of the barometric pressure data and the motion data. The processor 410 may acquire the barometric pressure change and the motion change by performing step 1301 and step 1303 during a specific time.

In step 1307, the processor 410 may determine whether the barometric pressure change corresponds to the motion change. The processor 410 or the malfunction determining unit 413 may analyze the correlation between the first data and the second data. As mentioned above with respect to FIG. 7A, if the barometer sensor 423 functions normally, the barometric pressure data change may establish the correlation (e.g., the proportional relation) with the motion data change. However, if the barometric pressure data change and the motion data change are irrelevant, the processor 410 may determine a malfunction of the barometer sensor 423.

The processor 410 may perform step 1311 if the barometric pressure change corresponds to the motion change, and perform step 1309 if the barometric pressure change does not correspond to the motion change.

In step 1309, the processor 410 may determine a malfunction of the barometer sensor 423. If determining the malfunction of the barometer sensor 423, the processor 410 may perform the steps of FIG. 8. For example, in response to a malfunction of the barometer sensor 423, the processor 410 may perform steps 803, 805, and 807 of FIG. 8.

In step 1311, the processor 410 may store the barometric pressure data and the motion data in the memory. The barometric pressure data and the motion data stored in the memory may be used to provide information of the barometer sensor 423 or information of the motion sensor 421.

Figure 14:
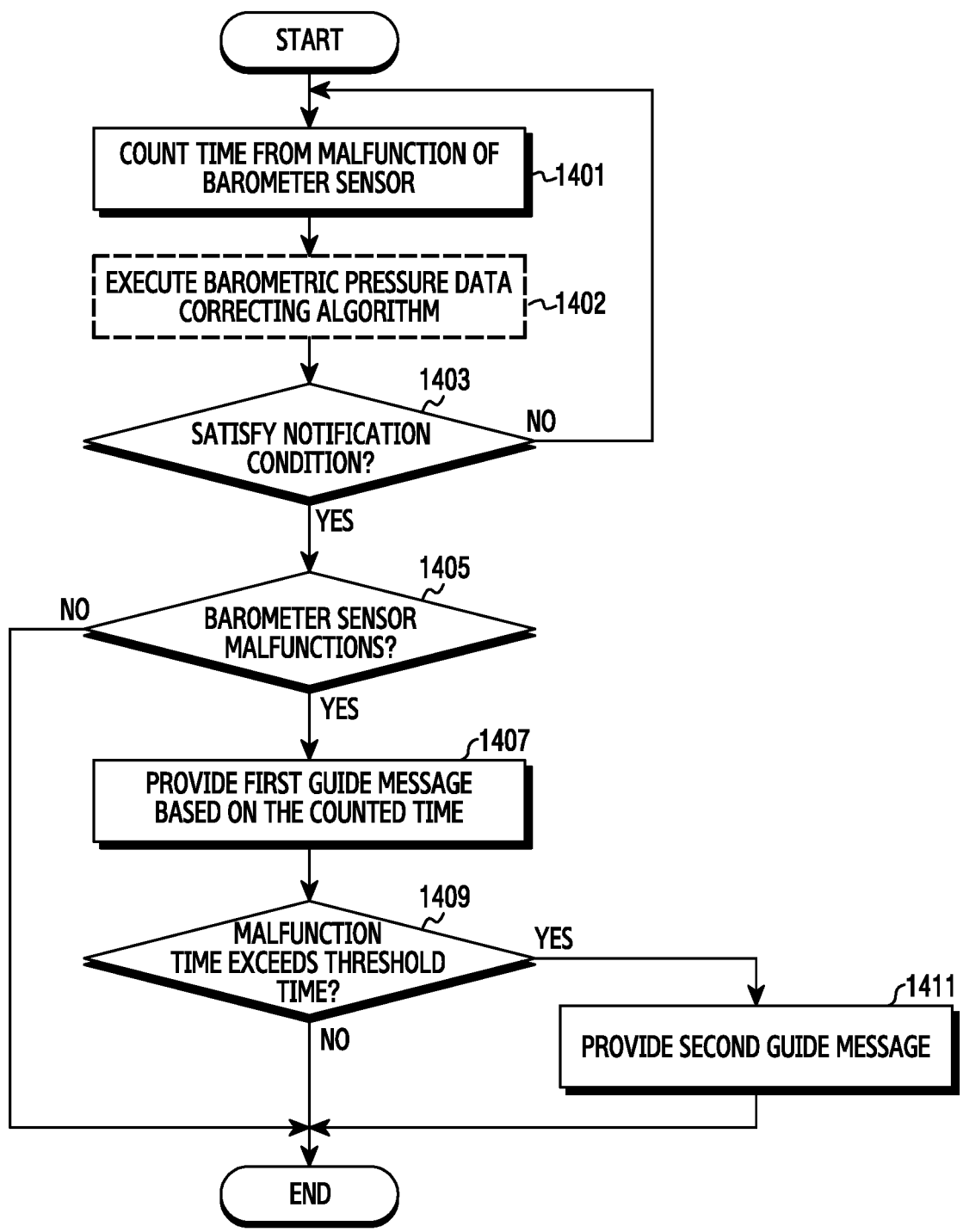
FIG. 14 is a flowchart of a method for providing a guide message for a barometer sensor based on time, according to an embodiment.

FIG. 14 is a flowchart of a method for providing a guide message regarding a barometer sensor based on time, according to an embodiment.

Referring to FIG. 14, in step 1401, the processor 410 may count a time from a malfunction of the barometer sensor 423. The processor 410 may provide different guide messages based on the malfunction time. In doing so, the processor 410 may count the time by driving a timer from a detected malfunction of the barometer sensor 423.

In step 1402, the processor 410 may perform a barometric pressure data correcting algorithm. The processor 410 or the sensor value correcting unit 417 may correct the barometric pressure data measured at the barometer sensor 423 while the barometer sensor 423 is malfunctioning. For example, the processor 410 may correct the barometric pressure data using the sensor data obtained from the motion sensor 421 of the electronic device 400. Alternatively, the processor 410 may receive from an external device (e.g., a smart phone) barometric pressure data measured at the external device through a communication unit, and correct the electronic device's 400 measured barometric pressure data with the received barometric pressure data.

Step 1402 may be omitted. The processor 410 may include a flag indicating the error in the barometric pressure data obtained during a malfunction of the barometer sensor 423. The processor 410 or the malfunction determining unit 413 may provide information (e.g., health information, level information, etc.) of the barometer sensor 423 by correcting the barometric pressure data including the flag in the barometric pressure data stored in the memory.

In step 1403, the processor 410 may determine whether a notification condition is satisfied. The notification condition may be a condition for outputting a message which guides or informs user of a malfunction of the barometer sensor 423. For example, the notification condition may include at least one of a display ON state (e.g., power-on, activation), a touch input, or a malfunction time exceeding a specific time (e.g., a first threshold time). If no input is received from the user during a specific time, the electronic device 400 may automatically enter a sleep mode. The sleep mode may determine that the user is not using the electronic device 400, and turn off the display (e.g., power-off, deactivation). The sleep mode, which is a low-power mode, may stop functions other than the essential functions.

However, if the display is turned off and the malfunction of the barometer sensor 423 is detected, the processor 410 may immediately notify of the malfunction of the barometer sensor 423 to the user. For example, if the user moves with the electronic device 400 on his/his arm (or wrist) and lifts the electronic device 400 to watch a screen of the electronic device 400 (or to use the electronic device 400), the display may be turned on automatically. If the display is turned on, the processor 410 may determine that the notification condition is satisfied. Alternatively, if the user uses the electronic device 400, the processor 410 may receive a touch input. In response to the received touch input, the processor 410 may determine that the notification condition is satisfied. Alternatively, if the barometer sensor 423 malfunctions over a first threshold time (e.g., 10 minutes, 20 minutes, etc.) and does not operate normally, the processor 410 may determine that the notification condition is satisfied.

The processor 410, upon determining the malfunction of the barometer sensor 423, may immediately display notification information (e.g., a guide message) of a state (e.g., the malfunction) of the barometer sensor 423, on the display. For example, in response to a malfunction of the barometer sensor 423, the processor 410 may automatically (or manually) turn on the display and display the notification information (e.g., a pop-up). Also, the processor 410 may display the notification information and concurrently output vibrations or a sound. In response to a malfunction of the barometer sensor 423, the processor 410 may determine whether the display is turned on (e.g., enabled), and, if the display is not turned on, turn on the display and display the notification information. Alternatively, in response to the malfunction of the barometer sensor 423, the processor 410 may determine whether the display is turned on (e.g., enabled), and, if the display is not turned on, output the vibrations or the sound notifying the malfunction of the barometer sensor 423 with the display turned off.

In step 1405, the processor 410 may determine whether the barometer sensor 423 malfunctions. The processor 410 may determine whether the barometer sensor 423 malfunctions when the notification condition is satisfied. If the user removes dust or a foreign substance from the external hole by shaking the electronic device 400, the barometer sensor 423 may operate normally. Alternatively, if water in the external hole is dried up after a specific time, the barometer sensor 423 may operate normally. Before notifying of the malfunction of the barometer sensor 423 to the user, the processor 410 may determine whether the barometer sensor 423 is malfunctioning. The processor 410 may perform step 1407 in response to the malfunction of the barometer sensor 423, and end this process in response to the normal function of the barometer sensor 423. That is, if the barometer sensor 423 operates normally before the notification is provided to the user, the processor 410 may not notify the malfunction of the barometer sensor 423 to the user, and the processor 410 may internally correct the barometric pressure data obtained during the malfunction of the barometer sensor 423.

In response to a malfunction of the barometer sensor 423, the processor 410 may provide a first guide message (e.g., the notification information about the state of the barometer sensor 423) based on the counted time in step 1407. For example, if the barometer sensor 423 malfunctions for a relatively short time (e.g., within 10 minutes, 20 minutes, etc.), the processor 410 may display on the display, the first guide message including at least one of a text such as "Please check any substance in the hole" or "Please shake off water", an image, or a video. According to the first guide message, the user may identify any foreign substance in the hole, and may take the necessary action or shake the electronic device 400 to remove the water. The processor 410 may identify a time length where the barometric pressure data (e.g., the first data) does not correspond to the motion data (e.g., the second data). Such a time length may indicate a time counted from the malfunction of the barometer sensor 423 to the current time. Based at least on the identified time length, the processor 410 may provide at least one of first notification information (e.g., the first guide message) and second notification information (e.g., a second guide message), as the notification information.

Although not depicted, the processor 410 may determine whether user feedback is detected after step 1407. The user feedback may indicate that the user identifies the notification information, e.g., the user waves or shakes the electronic device 400.

In step 1409, the processor 410) may determine whether a malfunction time of the barometer sensor 423 exceeds a threshold time (e.g., a second threshold time). For example, the processor 410 may determine whether the barometer sensor 423 malfunctions after the second threshold time (e.g., one hour) passes from the time of the malfunction. Alternatively, the processor 410 may notify the malfunction of the barometer sensor 423, detect the user feedback, and then determine whether the barometer sensor 423 malfunctions after the second threshold time (e.g., one hour) passes.

The processor 410 may perform step 1411 if the malfunction time of the barometer sensor 423 exceeds the threshold time, and finish this process if the malfunction time of the barometer sensor 423 falls within the threshold time. That is, if the barometer sensor 423 may operates normally within the threshold time (e.g., the second threshold time), the processor 410 may finish this process. The processor 410 may internally correct the barometric pressure data obtained during the malfunction time of the barometer sensor 423. If the user feedback is detected and the barometer sensor 423 operates normally after step 1407, the processor 410 may provide a guide message such as "Normally operates".

In step 1411, the processor 410 may provide a second guide message. The second guide message may be the same as or different from the first guide message. For example, if the barometer sensor 423 malfunctions for a relatively long time (e.g., 30 minutes, one hour, etc.), the processor 410 may display on the display, the second guide message including at least one of a text such as "Error detected in the barometer sensor. Please visit the repair center nearest you", an image, or a video. According to the second guide message, the user may identify any foreign substance in the hole, shake the electronic device 400, or visit the repair center.

The processor 410 may provide a button such as "Find the repair center nearest you" if the second guide message guides a user to visit the repair center, and may provide a location and a map of the nearest repair center from a current location if the user selects the button.

Figure 15:
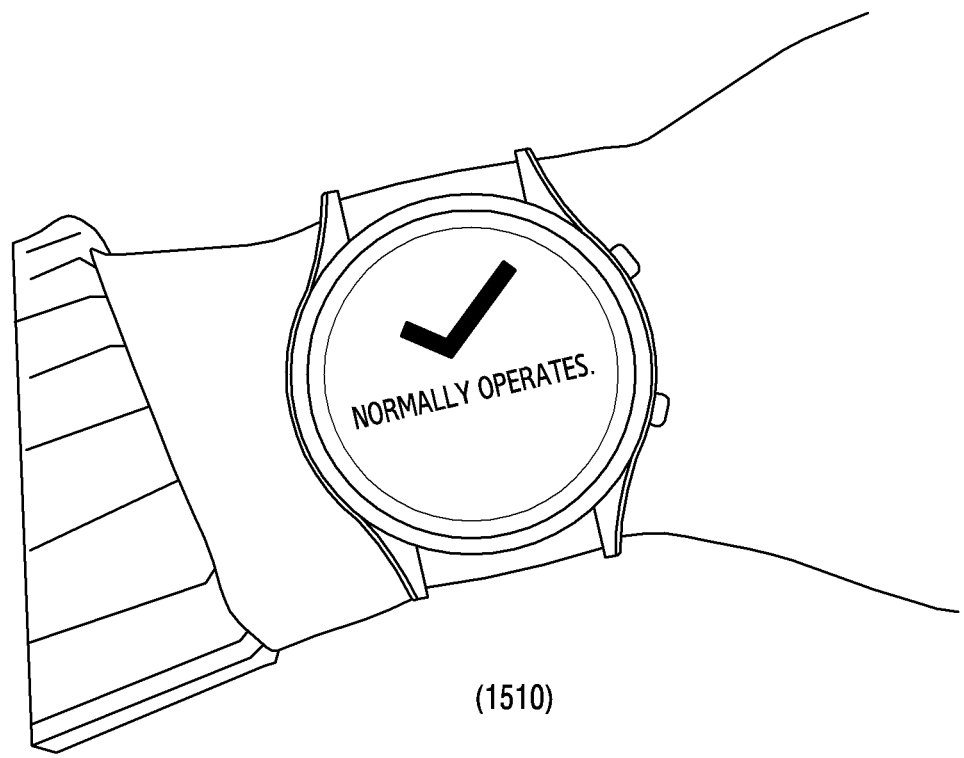
FIG. 15 is a diagram providing a guide message for a barometer sensor, according to an embodiment.
Figure 15:
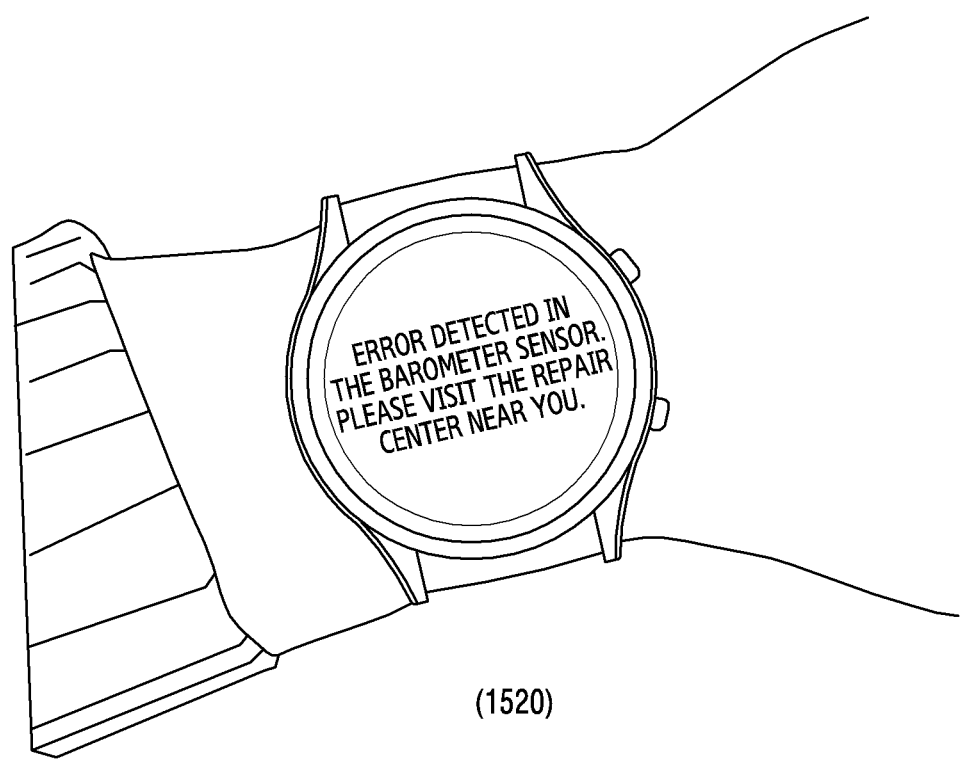

FIG. 15 is a diagram for providing a guide message regarding a barometer sensor based on time, according to an embodiment.

Referring to FIG. 15, the processor 410 may display a first guide message 1510 or a second guide message 1520 on a display. For example, the first guide message 1510 may be provided if user feedback is detected after step 1407 of FIG. 14 and a barometer sensor 423 operates normally. The second guide message 1520 may be the notification information provided in step 1411 of FIG. 14. For example, if the barometer sensor 423 malfunctions over a second reference time (e.g., 30 minutes, one hour, etc.), the processor 410 may provide the second guide message 1520 to recommend the user to visit a repair center. The user may identify the second guide message 1520 and take proper action.

Figure 16:
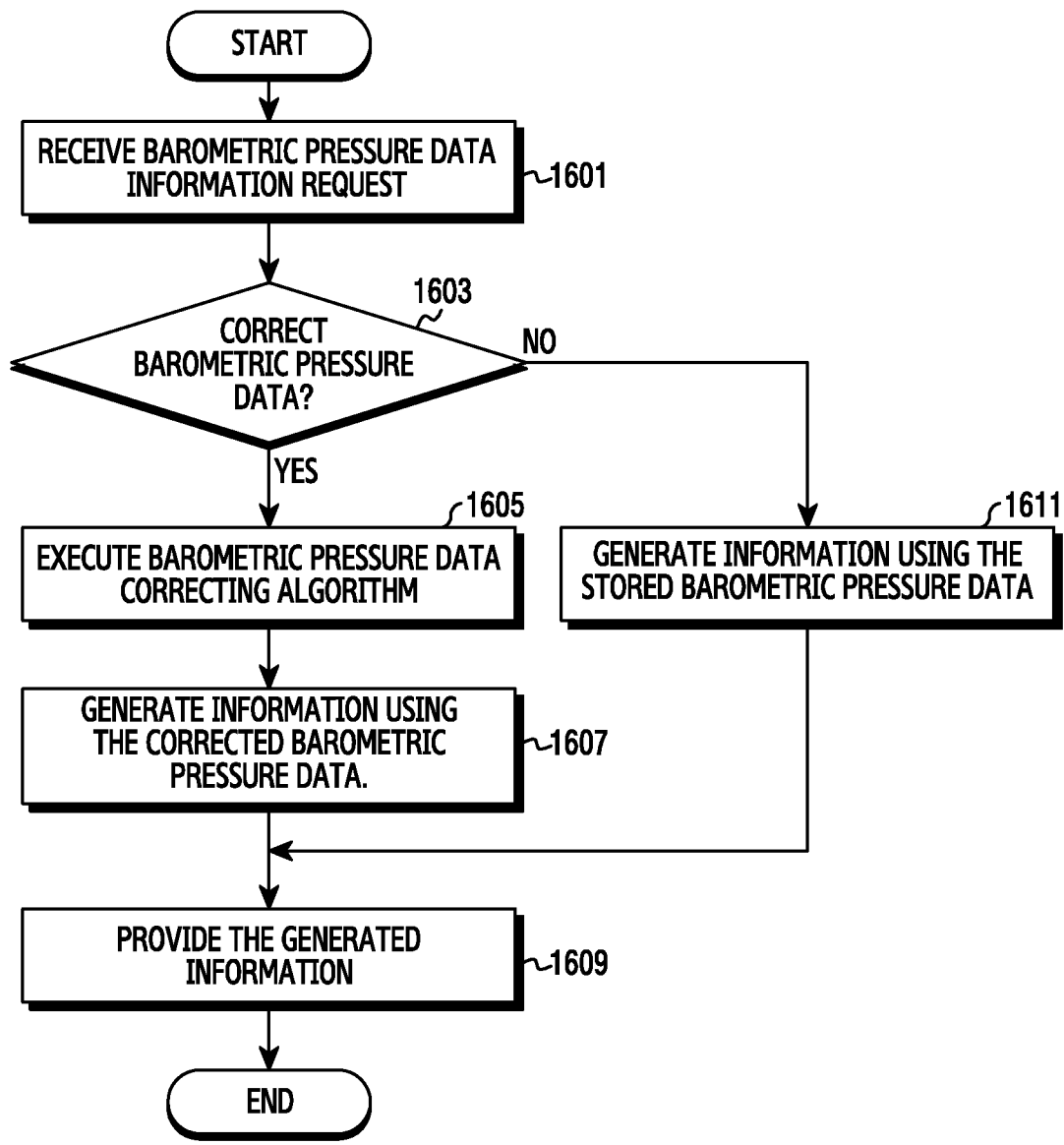
FIG. 16 is a flowchart of a method for providing barometer sensor information, according to an embodiment.

FIG. 16 is a flowchart of a method for providing barometer sensor information, according to an embodiment.

Referring to FIG. 16, in step 1601, the processor 410 may receive a barometric pressure data information request. The processor 410 may receive from the user, a request for displaying the barometric pressure data information such as health information, level information, and barometric pressure information. For example, if the user executes a health related application or selects a button to view the barometric pressure information in a setting menu of the electronic device 400, the processor 410 may determine the request for the barometric pressure data information.

In step 1603, the processor 410 may determine whether to correct the barometric pressure data. For example, the barometric pressure data stored in the memory may include a flag indicating that the data correction is needed. The barometric pressure data may be stored at designated time intervals (e.g., 10 seconds). If the barometric pressure data stored in the memory includes the flag, the processor 410 may determine to correct the data. If the barometric pressure data stored in the memory does not include the flag, the processor 410 may determine not to correct the data.

The processor 410 may perform step 1605 for the barometric pressure data correction, and perform step 1611 for no barometric pressure data correction.

In response to the barometric pressure data correction, the processor 410 may execute a barometric pressure data correcting algorithm in step 1605. The barometric pressure data correcting algorithm may correct the barometric pressure data with sensor data measured at other sensor (or an external device) during the time for the barometric pressure data correction. Alternatively, the barometric pressure data correcting algorithm may include various conventional methods for the data correction.

In step 1607, the processor 410 may generate information (e.g., stair climbing, level information) using the corrected barometric pressure data. For example, the processor 410 may generate the information regarding the barometric pressure data using the barometric pressure data corrected in step 1605. The information includes at least one of a text, an image, or a video, and may indicate a user interface screen displayed in the display.

In step 1609, the processor 410 may provide the generated information. The processor 410 may display the user interface corresponding to the information in the display. The information may be generated in step 1607 or step 1411 of FIG. 14. If the information contains the corrected barometric pressure data, the processor 410 may indicate the corrected data. The processor 410 may indicate the corrected data using at least one of a text, an image, or a video.

In response to no barometric pressure data correction, the processor 410 may generate information using the barometric pressure data stored in the memory in step 1611. That is, the processor 410 may generate the information using the barometric pressure data stored in the memory without correcting the data.

Figure 17:
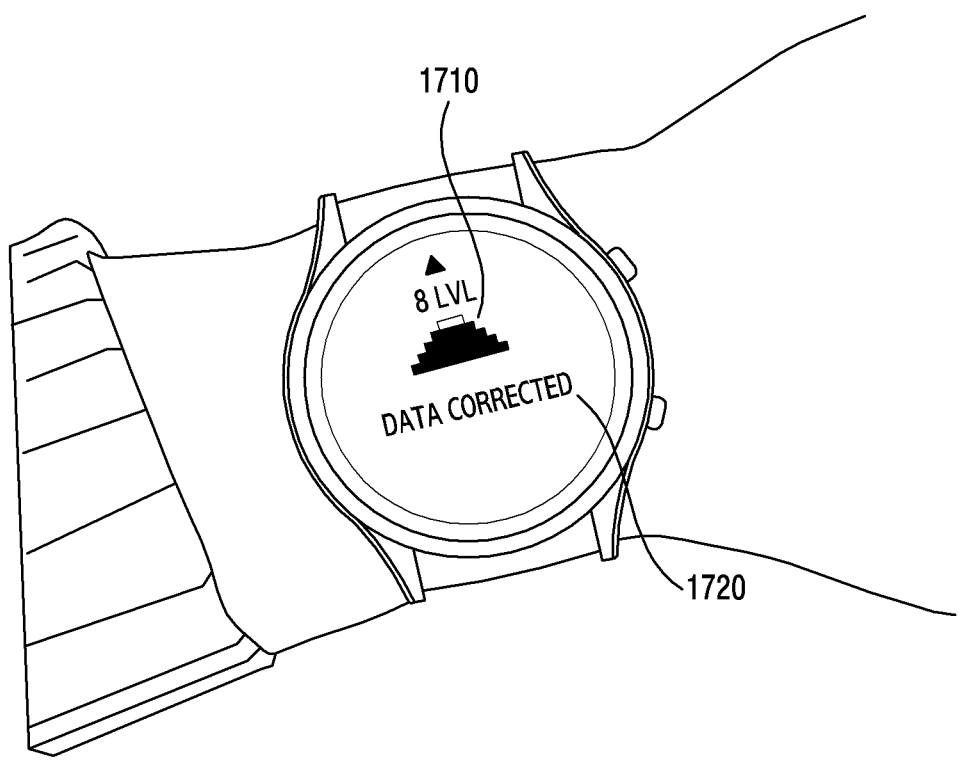
FIG. 17 is a diagram of providing barometer sensor information, according to an embodiment.

FIG. 17 is a diagram for providing barometer sensor information, according to an embodiment.

Referring to FIG. 17, the processor 410 may display barometer sensor information in the display. The barometer sensor information may be stair climbing information 1710 measured for a designated time. The designated time may be a time selected by the user or a day (specified until now). The selected time may be one hour from a current time or a particular time. The stair climbing information 1710 may include maximum height information (e.g., 8 floors), and include at least one of a text, an image, or a video. Besides the stair climbing information 1710, the barometer sensor information may include correction notification information 1720 indicating the corrected data. The correction notification information 1720 may be displayed according to user setting or setting of the electronic device 400.

Figure 18:
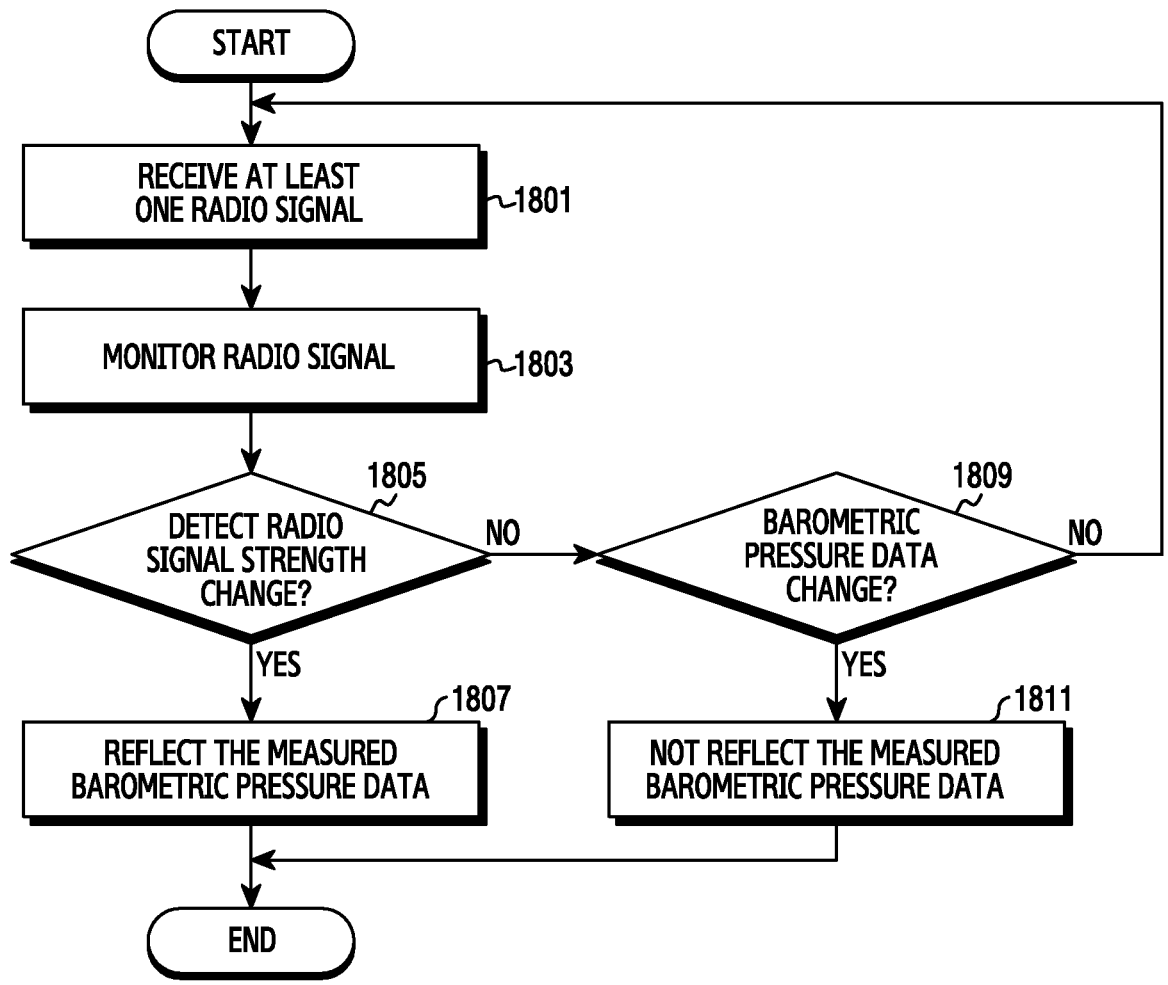
FIG. 18 is a flowchart of a method for determining malfunction of a barometer sensor, according to an embodiment.

FIG. 18 is a flowchart of a method for determining malfunction of a barometer sensor, according to an embodiment.

Referring to FIG. 18, in step 1801, the processor 410 may receive at least one radio signal. The processor 410 may determine whether the barometer sensor 423 malfunctions, using the communication unit, rather than the motion sensor 421. The processor 410 may receive a radio signal broadcast near the electronic device 400 through the communication unit in real time or on a periodic basis. For example, the radio signal may encompass any signal received using various communication schemes (e.g., BT, WiFi, NFC, cellular, etc.).

In step 1803, the processor 410 may monitor the received radio signal. For example, the processor 410 may measure a strength of the received radio signal. Alternatively, the processor 410 may identify whether identification of the received radio signal changes. The identification information may be information of an entity (e.g., a base station, an access point) which transmits the radio signal.

In step 1805, the processor 410 may determine whether a radio signal strength change is detected. If the signal strength decreases or increases, the signal strength change may be detected. Alternatively, if the radio signal identification information changes, a location change of the electronic device 400 may be determined. If the signal strength changes or the identification information changes, a location change of the electronic device 400 may be determined. The location change of the electronic device 400 may be identical or similar to the motion detection of the electronic device 400. If the user leaves the electronic device 400 alone, the location change of the electronic device 400 may not be detected. If the user carries (or wears) the electronic device 400 and moves, the location change of the electronic device 400 may be detected. Step 1805 may be identical or similar to step 1003 of FIG. 10.

The processor 410 may perform step 1807 if the signal strength change is detected, and perform step 1809 if the signal strength change is not detected.

In response to the signal strength change, the processor 410 may reflect the measured barometric pressure data in step 1807. The processor 410 may drive the barometer sensor 423 and store barometric pressure data measured by the barometer sensor 423 in the memory. Step 1807 may include steps 1303 through 1311 of FIG. 13.

In response to no signal strength change, the processor 410 may determine whether the barometric pressure data is changed in step 1809. If no change is detected in the radio signal strength (e.g., if the location change of the electronic device 400 is not detected), the barometric pressure data change may be small or little. However, although no motion is detected in the electronic device 400, if the barometer sensor 423 malfunctions, the barometric pressure data change may be detected.

The processor 410 may perform step 1811 in response to the barometric pressure data change, and return to step 1801 in response to no barometric pressure data change.

In step 1811, the processor 410 may not reflect the measured barometric pressure data. The processor 410 may not reflect the barometric pressure data measured by the barometer sensor 423, in the barometric pressure data information provided. Alternatively, the processor 410 may correct the measured barometric pressure data while the barometer sensor 423 malfunctions, or include a flag indicating the barometric pressure data correction when storing it in the memory. Also, the processor 410 may provide notification information regarding a state of the barometer sensor 423.

A method for operating an electronic device which includes a barometer sensor and a motion sensor, may include obtaining first data regarding a barometric pressure change using the barometer sensor, obtaining second data regarding a motion of the electronic device using the motion sensor while the first data is obtained, and if the first data corresponds to the second data, determining the first data as data corresponding to a barometric pressure.

The method may further include, if the first data does not correspond to the second data, providing notification regarding a state of the barometer sensor.

The method may further include, after providing the notification information, detecting a user feedback, if the user feedback is detected, obtaining third data regarding the barometric pressure change using the barometer sensor, obtaining fourth data regarding the motion of the electronic device using the motion sensor while the third data is obtained, and determining whether the third data corresponds to the fourth data.

The method may further include, as at least part of providing the notification information, identifying a time length where the first data does not correspond to the second data, and determining at least one of first notification information and second notification information as the notification information, based at least on the identified time length.

The method may further include, if a correlation of the first data and the second data satisfies a designated rule, determining that the first data corresponds to the second data.

The method may further include updating a stair climbing value of the electronic device, based at least on the determined data corresponding to the barometric pressure.

The method may further include, if the motion of the electronic device is detected using the motion sensor, obtaining the first data or the second data.

The method may further include determining a situation of the electronic device using the second data obtained from the motion sensor or data obtained from an external device connected with the electronic device, determining a barometric pressure interval value based at least on the determined situation, and determining the first data as the data corresponding to the barometric pressure, based at least on whether a change of the first data falls within the barometric pressure interval value.

The method may further include, if a request for information of the first data is received, determining whether to correct the first data, and providing the first data information by correcting the first data based at least on the determination.

A non-transitory computer-readable recording medium may store a program for obtaining first data regarding a barometric pressure change using a barometer sensor of an electronic device, obtaining second data regarding a motion of the electronic device using a motion sensor of the electronic device while the first data is obtained, and if the first data corresponds to the second data, determining the first data as data corresponding to a barometric pressure.

A non-transitory computer readable recording medium may include a hard disk, a floppy disc, a magnetic medium (e.g., a magnetic tape), an optical storage medium (e.g., a compact disc-ROM (CD-ROM) or a DVD, a magnetic-optic medium (e.g., a floptical disc)), and an internal memory. The one or more instructions may include a code generated by a complier or a code executable by an interpreter. The module or program module may further include at least one or more components among the aforementioned components, or may omit some of them, or may further include additional other components. Operations performed by the module, the program, or another component may be carried out sequentially, in parallel, repeatedly, or heuristically, or one or more of the operations may be executed in a different order or omitted, or one or more other operations may be added.

While the disclosure has been shown and described with reference to certain embodiments thereof, it will be understood by those skilled in the art that various changes in form and details may be made therein without departing from the scope of the disclosure. Therefore, the scope of the disclosure should not be defined as being limited to the embodiments, but should be defined by the appended claims and equivalents thereof.

What is claimed is:

1. An electronic device comprising:
   a barometer sensor configured to measure a barometric pressure of the electronic device;
   a motion sensor configured to detect a motion of the electronic device; and
   a processor configured to:
   obtain, using the barometer sensor, first data relating to a change of the barometric pressure,
   obtain, using the motion sensor while the first data is obtained, second data relating to the motion of the electronic device,
   when the first data corresponds to the second data, determine the first data as data corresponding to the barometric pressure,
   when the first data does not correspond to the second data, provide notification information relating to a state of the barometer sensor,
   detect a user feedback after the notification information is provided,
   when the user feedback is detected, obtain, using the barometer sensor, third data relating to the change of the barometric pressure,
   obtain, using the motion sensor while the third data is obtained, fourth data relating to the motion of the electronic device, and
   determine whether the third data corresponds to the fourth data.

2. The electronic device of claim 1, wherein the processor is further configured to:
   as at least part of providing the notification information, identify a time length where the first data does not correspond to the second data, and
   determine at least one of first notification information and second notification information as the notification information, based on the identified time length.

3. The electronic device of claim 1, wherein the processor is further configured to determine that the first data corresponds to the second data when a correlation between the first data and the second data satisfies a designated rule.

4. The electronic device of claim 1, wherein the processor is further configured to update a stair climbing value of the electronic device based on the determined data corresponding to the barometric pressure.

5. The electronic device of claim 1, wherein the processor is further configured to, when the motion of the electronic device is detected using the motion sensor, obtain one of the first data and the second data.

6. The electronic device of claim 1, wherein the processor is further configured to:
determine a situation of the electronic device using one of the second data obtained from the motion sensor and data obtained from an external device connected with the electronic device,
determine a barometric pressure interval value based on the determined situation, and
determine the first data as the data corresponding to the barometric pressure, based on whether a change of the first data falls within the barometric pressure interval value.

7. The electronic device of claim 1, wherein the processor is further configured to:
determine whether to correct the first data if a request for information of the first data is received, and
provide the information of the first data by correcting the first data.

8. The electronic device of claim 1, further comprising:
a communication unit configured to receive a radio signal, wherein the processor is further configured to:
determine a motion of the electronic device if a strength of the radio signal changes, and
determine whether the first data corresponds to the second data.

9. A method for operating an electronic device which comprises a barometer sensor and a motion sensor, the method comprising:
obtaining, using the barometer sensor, first data relating to a change of a barometric pressure;
obtaining, using the motion sensor while the first data is obtained, second data relating to a motion of the electronic device;
when the first data corresponds to the second data, determining the first data as data corresponding to a barometric pressure;
when the first data does not correspond to the second data, providing notification information relating to a state of the barometer sensor;
after providing the notification information, detecting a user feedback;
when the user feedback is detected, obtaining, using the barometer sensor, third data relating to the change of the barometric pressure;
obtaining, using the motion sensor while the third data is obtained, fourth data relating to the motion of the electronic device; and
determining whether the third data corresponds to the fourth data.

10. The method of claim 9, further comprising:
as at least part of providing the notification information, identifying a time length where the first data does not correspond to the second data; and
determining at least one of first notification information and second notification information as the notification information based on the identified time length.

11. The method of claim 9, further comprising:
when a correlation of the first data and the second data satisfies a designated rule, determining that the first data corresponds to the second data.

12. The method of claim 9, further comprising:
updating a stair climbing value of the electronic device based on the determined data corresponding to the barometric pressure.

13. The method of claim 9, further comprising:
when the motion of the electronic device is detected using the motion sensor, obtaining one of the first data or the second data.

14. The method of claim 9, further comprising:
determining a situation of the electronic device using one of the second data obtained from the motion sensor and data obtained from an external device connected with the electronic device;
determining a barometric pressure interval value based on the determined situation; and
determining the first data as the data corresponding to the barometric pressure based on whether a change of the first data falls within the barometric pressure interval value.

15. The method of claim 9, further comprising:
when a request for information of the first data is received, determining whether to correct the first data; and
providing the first data information by correcting the first data.

16. A non-transitory computer-readable recording medium having stored thereon a plurality of instructions that when executed perform a method for operating an electronic device which comprises a barometer sensor and a motion sensor, the method comprising:
obtaining, using the barometer sensor, first data relating to a change of a barometric pressure;
obtaining, using the motion sensor while the first data is obtained, second data relating to a motion of the electronic device;
when the first data corresponds to the second data, determining the first data as data corresponding to a barometric pressure;
when the first data does not correspond to the second data, providing notification information relating to a state of the barometer sensor;
after providing the notification information, detecting a user feedback;
when the user feedback is detected, obtaining, using the barometer sensor, third data relating to the change of the barometric pressure;
obtaining, using the motion sensor while the third data is obtained, fourth data relating to the motion of the electronic device; and
determining whether the third data corresponds to the fourth data.

* * * * *